United States Patent
Peterson et al.

(10) Patent No.: US 12,524,899 B2
(45) Date of Patent: Jan. 13, 2026

(54) AUTOMATIC PRESSURE ULCER MEASUREMENT

(71) Applicants: United States Government as Represented by the Department of Veterans Affairs, Washington, DC (US); University of South Florida, Tampa, FL (US)

(72) Inventors: Matthew J. Peterson, Tampa, FL (US); Linda J. Cowan, Tampa, FL (US); Kimberly S. Hall, Tampa, FL (US); Dmitry Goldgof, Tampa, FL (US); Sudeep Sarkar, Tampa, FL (US); Chih-Yun Pai, Tampa, FL (US); Hunter Morera, Tampa, FL (US); Yu Sun, Tampa, FL (US)

(73) Assignee: The United States Government as Represented by the Department of Veterans Affairs, Washington, DC (US)

( * ) Notice: Subject to any disclaimer, the term of this patent is extended or adjusted under 35 U.S.C. 154(b) by 514 days.

(21) Appl. No.: 17/768,952

(22) PCT Filed: Oct. 14, 2020

(86) PCT No.: PCT/US2020/055583
§ 371 (c)(1),
(2) Date: Apr. 14, 2022

(87) PCT Pub. No.: WO2021/076628
PCT Pub. Date: Apr. 22, 2021

(65) Prior Publication Data
US 2023/0022554 A1  Jan. 26, 2023

Related U.S. Application Data

(60) Provisional application No. 62/914,832, filed on Oct. 14, 2019.

(51) Int. Cl.
*G06T 7/62* (2017.01)
*G06T 7/00* (2017.01)
(Continued)

(52) U.S. Cl.
CPC ............. *G06T 7/62* (2017.01); *G06T 7/0012* (2013.01); *G06T 7/12* (2017.01); *G06T 7/90* (2017.01);
(Continued)

(58) Field of Classification Search
CPC .... G06T 7/62; G06T 7/12; G06T 7/90; G06T 7/0012; G06T 2200/04; G06T 2207/10024;
(Continued)

(56) References Cited

U.S. PATENT DOCUMENTS

| | | | |
|---|---|---|---|
| 2013/0249695 A1* | 9/2013 | Hann | A61B 5/441 340/573.7 |
| 2015/0119721 A1* | 4/2015 | Pedersen | G06T 7/90 600/476 |

(Continued)

OTHER PUBLICATIONS

Pai et al. "Automatic pressure ulcer measurement using RGB-D data." In: Proc. SPIE 10953, Medical Imaging 2019: Biomedical Applications in Molecular, Structural, and Functional Imaging, 1095320 (Mar. 15, 2019), [online] [retrieved on Dec. 14, 2020 (Dec. 14, 2020)]. (Year: 2019).*

(Continued)

*Primary Examiner* — John J Lee
(74) *Attorney, Agent, or Firm* — Ballard Spahr LLP

(57) ABSTRACT

Methods and systems for imaging and analysis are described. Accurate pressure ulcer measurement is critical in assessing the effectiveness of treatment. However, the traditional measuring process is subjective. Each health care provider may measure the same wound differently, espe- (Continued)

cially related to the depth of the wound. Even the same health care provider may obtain inconsistent measurements when measuring the same wound at different times. Also, the measuring process requires frequent contact with the wound, which increases risk of contamination or infection and can be uncomfortable for the patient. The present application describes a new automatic pressure ulcer monitoring system (PrUMS), which uses a tablet connected to a 3D scanner, to provide an objective, consistent, non-contact measurement method. The present disclosure combines color segmentation on 2D images and 3D surface gradients to automatically segment the wound region for advanced wound measurements.

20 Claims, 14 Drawing Sheets

(51) Int. Cl.
G06T 7/12 (2017.01)
G06T 7/90 (2017.01)
A61B 5/00 (2006.01)

(52) U.S. Cl.
CPC ......... *A61B 5/0077* (2013.01); *G06T 2200/04* (2013.01); *G06T 2207/10024* (2013.01); *G06T 2207/20021* (2013.01); *G06T 2207/20081* (2013.01); *G06T 2207/30096* (2013.01)

(58) Field of Classification Search
CPC . G06T 2207/20021; G06T 2207/20081; G06T 2207/30096; A61B 5/0077
See application file for complete search history.

(56) References Cited

U.S. PATENT DOCUMENTS

2018/0165554 A1* 6/2018 Zhang .................. G06N 3/045
2018/0357763 A1   12/2018 Pedersen et al.
2019/0053750 A1    2/2019 Chandrakasan et al.

OTHER PUBLICATIONS

Pai et al., "Automatic Pressure Ulcer Measurement using RGB-D Data," Proc. of SPIE, 2020, 10953:1095320-1-1095320-7 https://doi.org/10.1117/12.2512535.

* cited by examiner

AUTOMATIC PRESSURE ULCER MEASUREMENT

CROSS-REFERENCE TO RELATED APPLICATIONS

This application is a national stage filing under 35 U.S.C. § 371 of International Application No. PCT/US2020/055583, filed on Oct. 14, 2020, which claims the benefit of U.S. Provisional Application No. 62/914,832, filed Oct. 14, 2019, the entirety of both applications are hereby incorporated by reference in their entireties.

STATEMENT OF GOVERNMENT SUPPORT

This invention was made with government support under Grant Number W81XWH-16-1-0393 awarded by the Medical Research and Development Command. The government has certain rights in the invention.

BACKGROUND

Pressure ulcers (PrUs) are wounds of the skin and underlying tissue, usually over bony prominences such as the hip, sacrum, coccyx, ischium, heels, ankles, etc. They are typically the result of impaired blood supply and reduced cellular function within the cells of the skin and underlying tissue from unrelieved mechanical forces (e.g., pressure) and/or shearing or friction forces that cause a breakdown in the skin's integrity. Wound care of PrUs affects millions of patients and costs billions of dollars in treatment annually in the United States. According to a report from the U.S. Department of Health and Human Services, more than 2.5 million people develop PrUs each year in the U.S. Wound measurement has a vital role in evaluating healing progress. A precise measurement for monitoring healing progress helps the healthcare provider predict the treatment outcome. Current ruler-based techniques commonly require the health care provider to find the greatest length in the head-to-toe direction and the perpendicular width; depth is determined by placing a cotton swab into the wound bed to find the deepest part. This technique and similar methods of wound assessment may be inaccurate since PrUs can be irregularly shaped. Computer-aided measurement is a method to avoid the subjective nature of manual measurement, with potential to provide more accurate and precise measurements. Determining wound area with photographs can avoid direct contact with the wound, reducing the chance of wound contamination and infection. However, it is limited by the curvature of the wound bed and the camera angle toward the wound. These and other considerations are addressed by the present description.

SUMMARY

It is to be understood that both the following general description and the following detailed description are exemplary and explanatory only and are not restrictive. Methods and systems for imaging and analysis are described herein. A computing device may capture or receive one or more images. The one or more images may be two-dimensional images or three-dimensional images. The three-dimensional image may comprise a plurality of color segmentations and a plurality of surface gradient segmentations. The computing device may generate a two-dimensional image comprising the plurality of color segmentations. The two-dimensional image may be based on the three-dimensional image. The computing device may determine one or more candidate segments associated with an object boundary. The computing device may determine the object boundary based on the color segmentations and the surface gradient segmentations. The computing device may make this determination based on a surface gradient segmentation associated with one or more candidate segments.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1A:
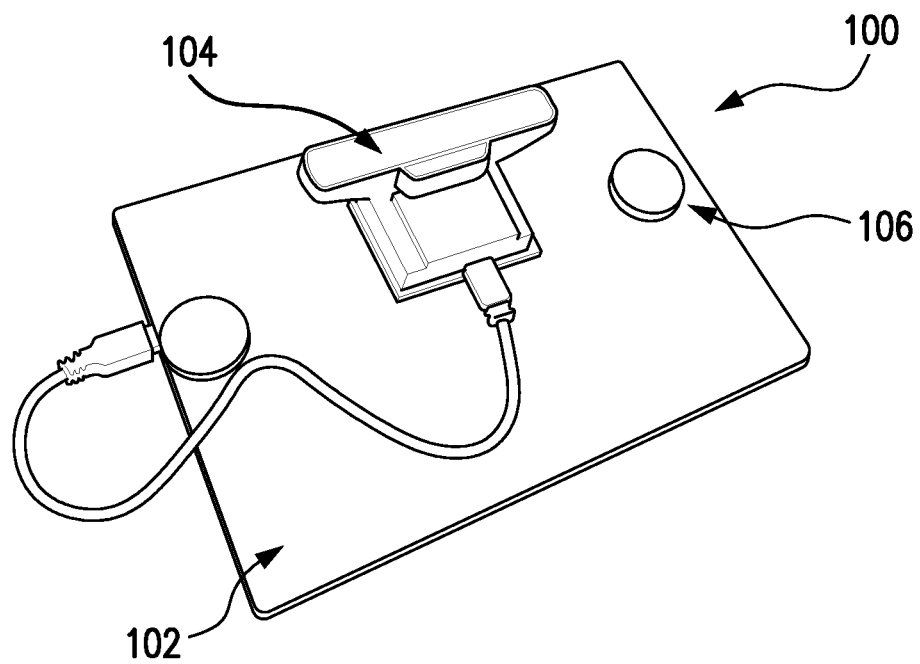
FIG. 1A shows an example imaging device.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The present methods and systems can be operational with numerous other general purpose or special purpose computing system environments or configurations. Examples of well-known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

This detailed description may refer to a given entity performing some action. It should be understood that this language may in some cases mean that a system (e.g., a computer) owned and/or controlled by the given entity is actually performing the action.

Described herein are methods and systems for imaging and analysis. Described herein is a measurement method using an imaging device, such as a 3D camera connected to a tablet, as part of a Pressure Ulcer Monitoring System (PrUMS). The PrUMS may be lightweight and easy to carry, such as between patient rooms. A PrU segmentation algorithm (and variants thereof), as further described herein, may be combined with automatic dimension measurement (e.g., for a wound). The segmentation algorithm may utilize color segmentation on a 2D image. The segmentation algorithm may utilize a 3D surface gradient segmentation in a 3D image so as to classify a wound. A depth map of the wound region may be extracted for surface gradient measurement.

Figure 1B:
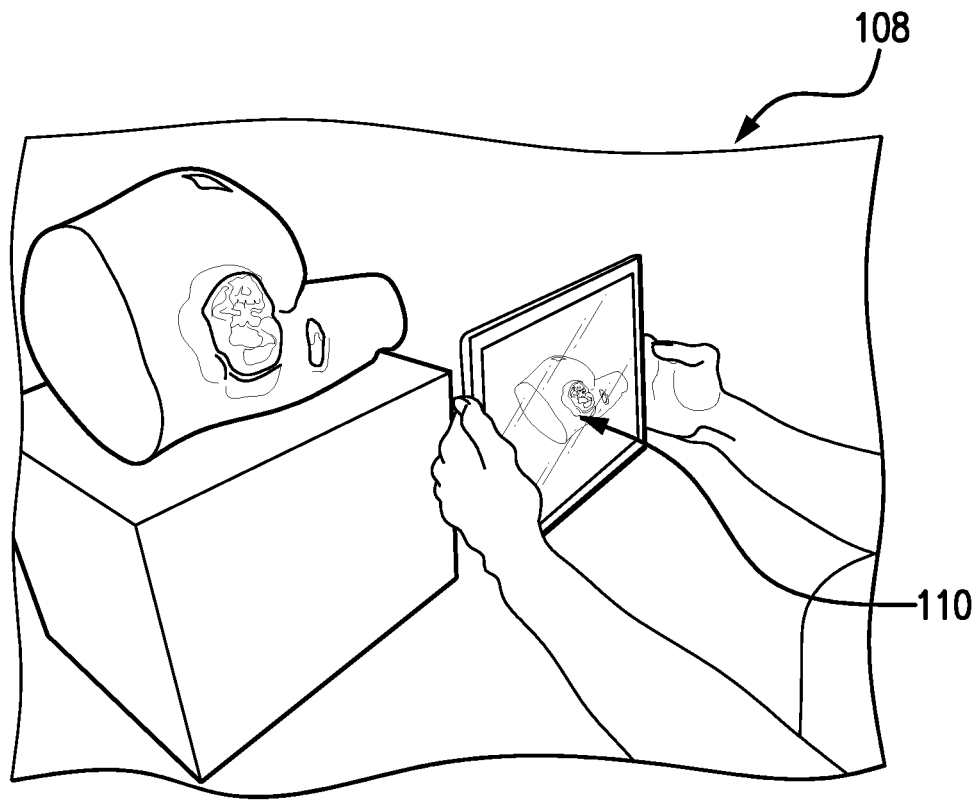
FIG. 1B shows an example imaging process.

Turning now to FIGS. 1A-1B, an example imaging device 100 and examples of use are shown. The imaging device 100 may comprise a tablet (as shown), a computer (e.g., the computer 1401), a smartphone, a laptop, or any other computing device. As shown in FIG. 1A, the imaging device 100 may include an image capture device 104 such as a camera, a scanning device, an infrared device, or any other image capture device that can capture image data. In some examples, the imaging device 100 and the image capture device 104 may be the same device or they may be separate devices which are in communication with each other. That is, the imaging device 100 may be coupled to, or otherwise in communication with, the image capture device 104. The imaging device 100 may include one or more handles 106. The handles 106 may comprise any suitable means for gripping and or stabilizing the imaging device. A computing device may be in communication with the image capture device 104. The computing device and the image capture device 104 may be communicatively coupled by any means such as USB cable, coaxial cable, Bluetooth, Zigbee, Ethernet cable, interne, WiFi, cellular network and the like. The image capture device 104 may be affixed to the computing device, such as by glue, magnets, screws, nails, clips, combinations thereof, and the like, or any other suitable means.

As shown in FIG. 1B, the imaging device 100 may be used to generate an image, such as a wound (e.g., a Pressure Ulcer (PrU)). As can be seen in FIG. 1B, the imaging device 100 may comprise a display 110. The display 110 may be configured to display content. The content may comprise an image, video content, or any other content. The display 110 may display one or more images. The display 110 may display an image of a wound or any other relevant images, data, graphics, videos, combinations thereof, and the like. The display 110 may display one or more interactive elements. The one or more interactive elements may comprise, for example, a "button," a hyperlink, a field (e.g., a blank space to be populated via a user input), combinations thereof and the like. For example, the display 110 may comprise a user interface. For example, the display may comprise a touch-sensitive display such as a capacitive touch sensitive display, an electrical contact trace element, or any other means for receiving a user input by way of, for example, touch or pressure. A user may interact with the display 110. As can be seen in FIG. 1B, the imaging device 100 may be held in proximity to the wound so as to capture the image. Likewise, the imaging device 100 may be held in proximity to the wound so as to capture depth data. The display 110 may include a target indicator at the center of the display. A user may use the target indicator to center the target wound in the camera frame for wound measurement. The target indicator may comprise for example, a "bulls-eye," or any other indicator which may indicate that a target wound has been centered in an image capture field. The image capture field may comprise an area in front of the image capture device. While the term "image capture field" is used, it is to be understood that the image capture field also includes a depth measurement (e.g., both 2D and 3D imaging and data capture are contemplated). The display may present an option. The user may select the option to start a scanning process. The scanning process may comprise various steps. The scanning process may comprise capturing an image. The scanning process may comprise determining depth data by way of RGB scan, sonar, radar, lidar, time-of-flight, or any other suitable technique. The scanning process may comprise generating a three-dimensional reconstruction of the image and/or depth data.

Figure 2:
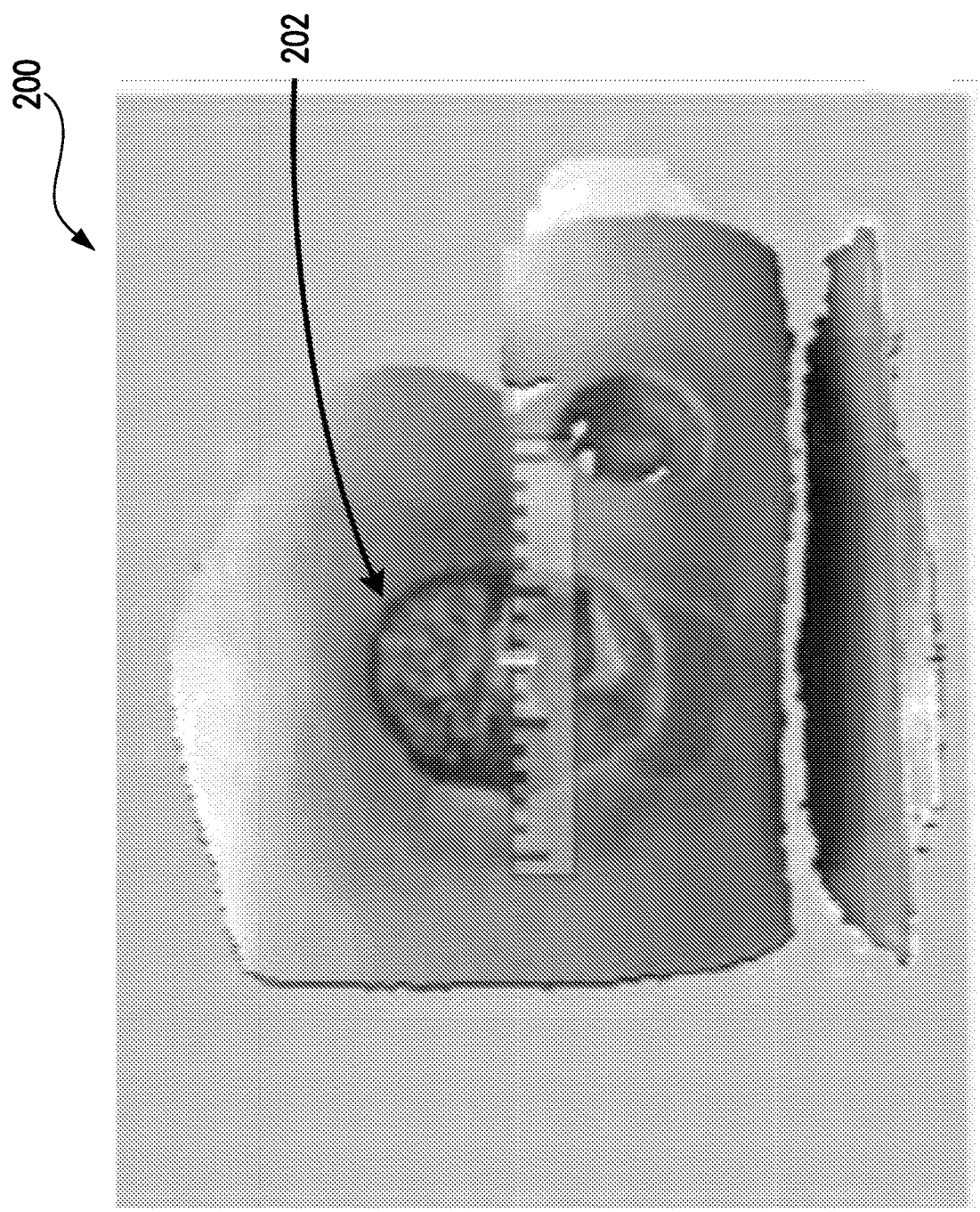
FIG. 2 shows an example scanning interface.

FIG. 2 shows an example of an image which may be displayed on the display 110. The image may be captured in any way, such as with a camera, scanned from printed photographs, or through other image capturing techniques that are known in the art. As can been seen in FIG. 2, the display 110 may display an image of a wound, or a virtual representation of the wound (e.g., virtual wound 202), or some other image. As can be seen in the figure, a graphic, for example, a ruler or a grid, may be overlaid on the image. Graphics overlaid on the image may be solid or transparent. The display 110 may comprise an interface 112. The interface 112 may facilitate interaction between a user and the imaging device 100. The interface 112 may allow a user to manipulate the image. For example, a user may use the interface 112 to orient an image on the display 110. A user may perform any of a variety of operations on the image via the interface 112, such as orienting an image, magnifying an image, decreasing the size of an image, zooming in or out of an image, adjusting the hue, saturation, color, or other photo editing operations, or any other operation related to selecting, manipulating, or otherwise interacting with the image. Likewise, a user may use the interface 112 to select, manipulate or interact with video or audio content.

Figure 3:
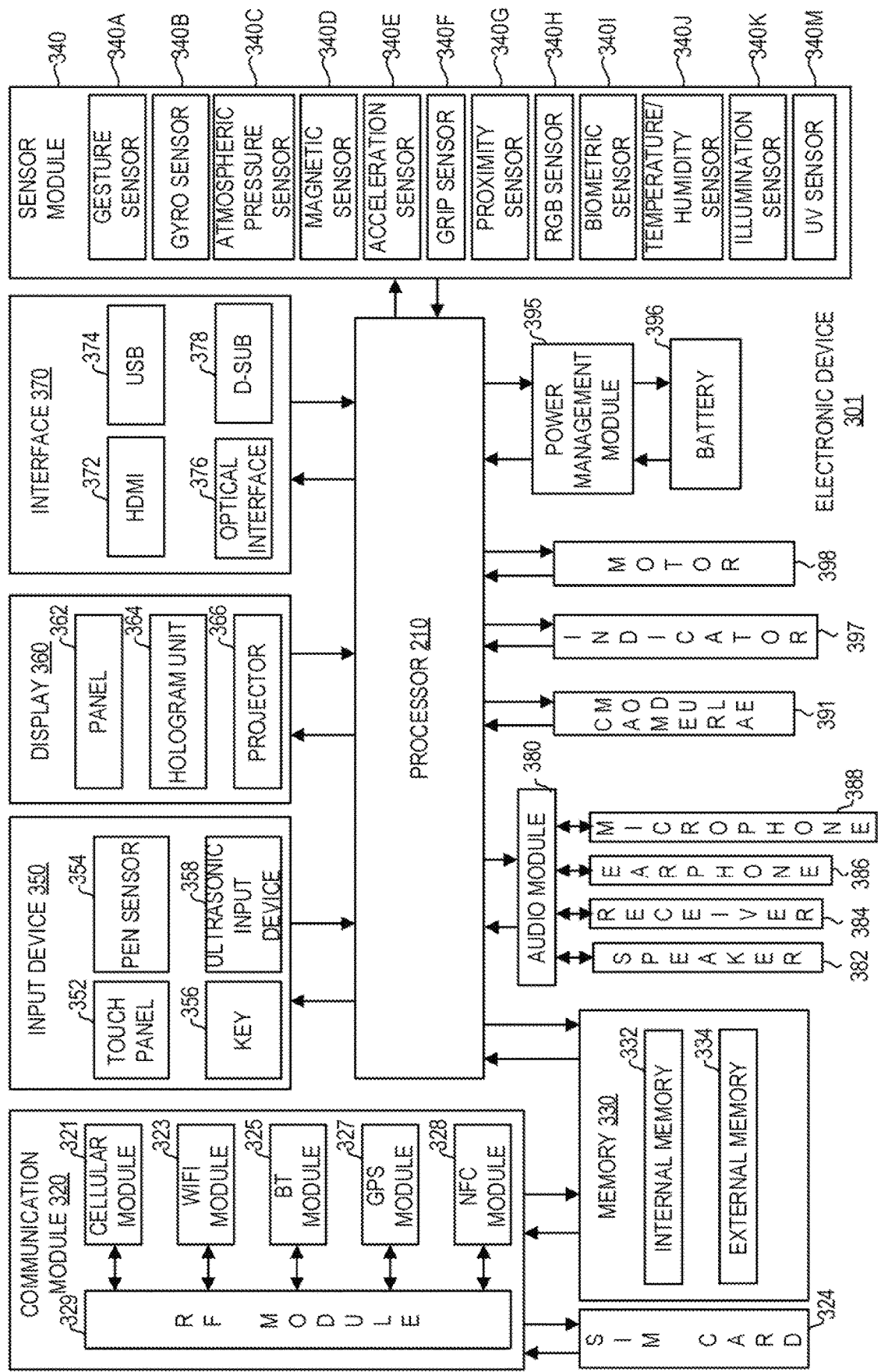
FIG. 3 shows an example block diagram of a device.

FIG. 3 is a block diagram of an electronic device 301 according to various exemplary embodiments. The electronic device 301 may include one or more processors (e.g., Application Processors (APs)) 310, a communication module 320, a subscriber identity module 324, a memory 330, a sensor module 340, an input unit 350, a display 360, an interface 370, an audio module 380, a camera module 391, a power management module 395, a battery 396, an indicator 397, and a motor 398. Camera module 391 may comprise a camera configured to capture RGB data. Likewise, camera module 391 may comprise a 3D camera.

The processor 310 may control a plurality of hardware or software constitutional elements connected to the processor 310 by driving, for example, an operating system or an application program, and may process a variety of data including multimedia data and may perform any arithmetic operation (for example, distance calculations). For example, the processor 310 may be configured to receive an image of a real-world object (e.g., a wound) and generate a virtual object, for example the virtual wound 202. The processor 310 may be implemented, for example, with a System on Chip (SoC). According to one exemplary embodiment, the processor 310 may further include a Graphic Processing Unit (GPU) and/or an Image Signal Processor (ISP). The processor 310 may include at least one part (e.g., a cellular module 321) of the aforementioned constitutional elements of FIG. 3. The processor 310 may process an instruction or data, for example an image segmentation and wound classification program as described further herein, which may be received from at least one of different constitutional elements (e.g., a non-volatile memory), by loading it to a volatile memory and may store a variety of data in the non-volatile memory. The processor may receive inputs such as sensor readings and execute an image segmentation and wound classification program as described further herein. Further, the processor 310 may facilitate human-machine interactions. For example, as a user moves the imaging device 100 with respect to the target real-world wound, the processor 310 might adjust the position and the orientation of the virtual wound 202 so as to maintain the virtual wound 202 in the center of the display.

The communication module 320 may include, for example, the cellular module 321, a Wi-Fi module 323, a BlueTooth (BT) module 325, a GNSS module 327 (e.g., a GPS module, a Glonass module, a Beidou module, or a Galileo module), a Near Field Communication (NFC) module 328, and a Radio Frequency (RF) module 329. In an exemplary configuration, the electronic device 301 may transmit data determined by the sensor module 340. For example, the electronic device 301 may transmit, to a mobile device, via the BT module 325, data gathered by the sensor module 340.

The cellular module 321 may provide a voice call, a video call, a text service, an interne service, or the like, for example, through a communication network. According to one exemplary embodiment, the cellular module 321 may identify and authenticate the electronic device 301 in a network by using the subscriber identity module (e.g., a Subscriber Identity Module (SIM) card) 324. According to one exemplary embodiment, the cellular module 321 may perform at least some functions that can be provided by the processor 33. According to one exemplary embodiment, the cellular module 321 may include a Communication Processor (CP).

Each of the WiFi module 323, the BT module 325, the GNSS module 327, or the NFC module 328 may include, for example, a processor for processing data transmitted/received via a corresponding module. According to a certain exemplary embodiment, at least some (e.g., two or more) of the cellular module 321, the WiFi module 323, the BT module 325, the GPS module 327, and the NFC module 328 may be included in one Integrated Chip (IC) or IC package. The GPS module 327 may communicate via the network with another device, for example, a mobile device, a server (e.g., an electronic medical records server), or some other computing device (e.g., an external computer vision device).

The RF module 329 may transmit/receive, for example, a communication signal (e.g., a Radio Frequency (RF) signal). The electronic device 301 may transmit and receive data from the mobile device via the RF module 329. Likewise, the electronic device 301 may transmit and receive data (e.g., medical records and/images) from, for example, an electronic medical records server via the RF module 329. The RF module may transmit a request for an electronic medical record such as an image (e.g., a wound image). The RF module 329 may include, for example, a transceiver, a Power Amp Module (PAM), a frequency filter, a Low Noise Amplifier (LNA), an antenna, or the like. According to another exemplary embodiment, at least one of the cellular module 321, the WiFi module 323, the BT module 325, the GPS module 327, and the NFC module 328 may transmit/receive an RF signal via a separate RF module.

The subscriber identity module 324 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 330 (e.g., the memory 730) may include, for example, an internal memory 332 or an external memory 334. The internal memory 332 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 334 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 334 may be operatively and/or physically connected to the electronic device 301 via various interfaces.

The sensor module 340 may measure, for example, a physical quantity or detect an operational status of the electronic device 301, and may convert the measured or detected information into an electric signal. The sensor module 340 may include, for example, at least one of a gesture sensor 340A, a gyro sensor 340B, a pressure sensor 340C, a magnetic sensor 340D, an acceleration sensor 340E, a grip sensor 340F, a proximity sensor 340G, a color sensor 340H (e.g., a Red, Green, Blue (RGB) sensor), a bio sensor 340I, a temperature/humidity sensor 340J, an illumination sensor 340K, an Ultra Violet (UV) sensor 340M, an ultrasonic sensor 340N, and an optical sensor 340P. Proximity sensor 340G may comprise LIDAR, radar, sonar, time-of-flight, infrared or other proximity sensing technologies. The gesture sensor 340A may determine a gesture associated with the electronic device 301. For example, as the electronic device 301 moves in relation to a patient, the gyro sensor 340B may detect the movement and determine that a viewing angle with relation to the target wound has changed. Likewise, the proximity sensor may determine that, at the same time, a distance to the target wound changed. The processor 310 may account for the determinations of the gyro sensor 340B and the proximity sensor 340G so as to adjust measurements and displays appropriate. The gyro sensor 340B may be configured to determine a manipulation of the electronic device 301 in space, for example if the electronic device 301 is in a user's hand, the gyro sensor 340B may determine the user has rotated the user's head a certain number of degrees. Accordingly, the gyro sensor 340B may communicate a degree of rotation to the processor 310 so as to adjust the display of the virtual wound 202 by the certain number of degrees and accordingly maintaining the position of, for example, the virtual wound 202 as rendered on the display. The proximity sensor 340G may be configured to use sonar, radar, LIDAR, or any other suitable means to determine a proximity between the electronic device and the one or more physical objects. For example, the proximity sensor 340G may determine the proximity of a patient, a wound, etc. The proximity sensor 340G may communicate the proximity of the wound to the processor 310 so the virtual wound 202 may be correctly rendered on the display and further so that accurate measurement may be recorded. The ultrasonic sensor 340N may also be likewise configured to employ sonar, radar, LIDAR, time of flight, and the like to determine a distance and/or a 3D dimensional map of the target wound (e.g., by "sounding"). The ultrasonic sensor may emit and receive acoustic signals and convert the acoustic signals into electrical signal data. The electrical signal data may be communicated to the processor 310 and used to determine any of the image data, spatial data, or the like. According to one exemplary embodiment, the optical sensor 340P may detect ambient light and/or light reflected by an external object (e.g., a user's finger. etc.), and which is converted into a specific wavelength band by means of a light converting member. Additionally or alternatively, the sensor module 340 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 340 may further include a control circuit for controlling at least one or more sensors included therein. In a certain exemplary embodiment, the electronic device 301 may further include a processor configured to control the sensor module 304 either separately or as one part of the processor 310, and may control the sensor module 340 while the processor 310 is in a sleep state.

The input device 350 may include, for example, a touch panel 352, a (digital) pen sensor 354, a key 356, or an ultrasonic input device 358. The touch panel 352 may recognize a touch input, for example, by using at least one of an electrostatic type, a pressure-sensitive type, and an ultrasonic type. In addition, the touch panel 352 may further include a control circuit. The touch panel 352 may further include a tactile layer and thus may provide the user with a tactile reaction.

The (digital) pen sensor 354 may be, for example, one part of a touch panel, or may include an additional sheet for recognition. The key 356 may be, for example, a physical button, an optical key, a keypad, or a touch key. The ultrasonic input device 358 may detect an ultrasonic wave generated from an input means through a microphone (e.g., a microphone 388) to confirm data corresponding to the detected ultrasonic wave.

The display 360 (e.g., the display 360) may include a panel 362, a hologram unit 364, or a projector 366. The panel 362 may be implemented, for example, in a flexible, transparent, or wearable manner. The panel 362 may be constructed as one module with the touch panel 352. According to one exemplary embodiment, the panel 362 may include a pressure sensor (or a force sensor) capable of measuring strength of pressure for a user's touch. The pressure sensor may be implemented in an integral form with respect to the touch panel 352, or may be implemented as one or more sensors separated from the touch panel 352.

The hologram unit 364 may use an interference of light and show a stereoscopic image in the air. The projector 366 may display an image by projecting a light beam onto a screen. The screen may be located, for example, inside or outside the electronic device 301. According to one exemplary embodiment, the display 360 may further include a control circuit for controlling the panel 362, the hologram unit 364, or the projector 366.

The display 360 may display the real-world scene (e.g., the real-world wound) and/or an augmented reality scene (e.g., the virtual wound 202 and the ruler). The display 360 may receive image data captured by camera module 391 from the processor 310. The display 360 may display the image data. The display 360 may display the one or more physical objects. The display 360 may display one or more virtual objects such as the virtual wound 202, the ruler, a target, combinations thereof, and the like.

The interface 370 may include, for example, a High-Definition Multimedia Interface (HDMI) 372, a Universal Serial Bus (USB) 374, an optical communication interface 376, or a D-subminiature (D-sub) 378. The interface 370 may be included, for example, in the communication interface 770 of FIG. 7. Additionally or alternatively, the interface 370 may include, for example, a Mobile High-definition Link (MHL) interface, a Secure Digital (SD)/Multi-Media Card (MMC) interface, or an Infrared Data Association (IrDA) standard interface.

The audio module 380 may bilaterally convert, for example, a sound and electric signal. At least some constitutional elements of the audio module 380 may be included in, for example, the input/output interface 1410 of FIG. 14. The audio module 380 may convert sound information which is input or output, for example, through a speaker 382, a receiver 384, an earphone 386, the microphone 388, combinations thereof, and the like.

The camera module 391 is, for example, a device for image and video capturing, and according to one exemplary embodiment, may include one or more image sensors (e.g., a front sensor or a rear sensor), a lens, an Image Signal Processor (ISP), or a flash (e.g., LED or xenon lamp). The camera module 391 may comprise a forward facing camera for capturing a scene. The camera module 391 may also comprise a rear-facing camera for capturing eye-movements or changes in gaze.

The power management module 395 may manage, for example, power of the electronic device 301. According to one exemplary embodiment, the power management module 395 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 396 and voltage, current, and temperature during charging. The battery 396 may include, for example, a rechargeable battery and/or a solar battery.

The indicator 397 may display a specific state, for example, a booting state, a message state, a charging state, or the like, of the Electronic device 301 or one part thereof (e.g., the processor 33). The motor 398 may convert an electric signal into a mechanical vibration, and may generate a vibration or haptic effect. Although not shown, the Electronic device 301 may include a processing device (e.g., a GPU) for supporting a mobile TV. The processing device for supporting the mobile TV may process media data conforming to a protocol of, for example, Digital Multimedia Broadcasting (DMB), Digital Video Broadcasting (DVB), MediaFlo™, or the like.

Figure 4A:
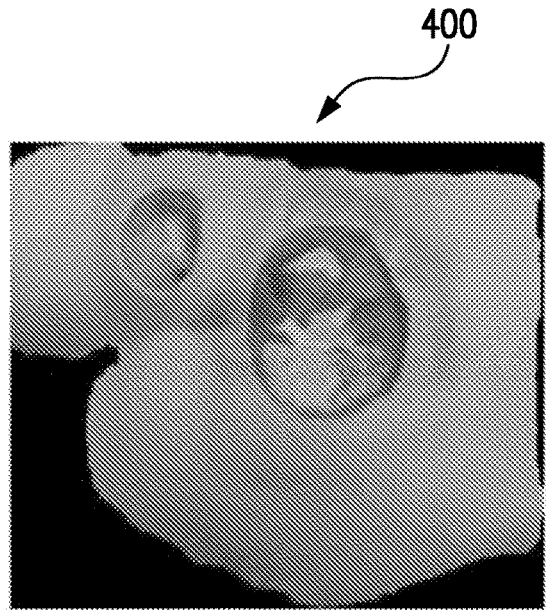
FIG. 4A shows an example three-dimensional image.

Turning now to FIGS. 4A-4D, various example images that may be captured using the imaging device 100 are shown. Though the description herein of FIGS. 4A-4D indicate the imaging device 100 as the device that performs imaging analysis, it is to be understood that the steps performed by the imaging device 100 as described herein may be performed by another computing device (e.g., a device not coupled to the imaging device 100). FIG. 4A shows an example image 400 of a patient and a wound (e.g., the virtual wound 202). As can be seen, the image of the wound comprises both skin and wound. After capturing a two-dimensional image and generating a three-dimensional model, the imaging device 100 may perform a color segmentation function on the image. Color segmentation may determining a hue and a saturation difference associated with a given area of the image (e.g., one or more pixels or one or more groups of pixels). The imaging device 100 may map the three dimensional model onto a two-dimensional plane as a two-dimensional image. The imaging device 100 may identify the hue of each pixel of the image. The imaging device 100 may determine the hue at any point in the image, for example point (i, j) and compare it to the hue of skin ($Hue_D$). The imaging device 100 may generate multiple would segmentations by filtering out a color, or a plurality of similar colors. For example, the imaging device 100 may filter a color associated with skin surrounding a wound. The imaging device 100 may filter the color associated with skin using different thresholds of $Hue_{diff}$, where $Hue_{diff}(i, j)=|Hue(i, j)-Hue_D|$, where $Hue_{diff}$ has the same dimensions as the 2D color image. For example, the imaging device 100 may filter a color associated with the wound (e.g., a red color).

In another example, the imaging device 100 may filter out skin with different thresholds of saturation. Saturation (or saturation difference) may refer to a difference in saturation between a given pixel and an approximate center of the image. The imaging device 100 may perform a segmentation algorithm. To perform the segmentation algorithm on patients, a color segmentation part may be modified to use saturation instead of hue because a difference in the saturation of the tissue of the skin and the wound of a patient may result in a higher contrast in saturation than in hue. The imaging device 100 may determine a saturation difference map. The saturation difference map ($Sat_{diff}$) may be computed as $Sat_{diff}(i, j)=|Sat_{(i,j)}-Sat_{center}|$, where $Sat_{center}$ is the saturation of the approximate center of the targeted wound region and $Sat_{(i,j)}$ is the saturation of some other point.

The imaging device 100 may perform morphological erosion. For example, the imaging device 100 may implement a fill algorithm to separate close objects and fill holes. As another example, the imaging device 100 may identify and label objects using a connective component algorithm. The imaging device 100 may select a target object in each segmentation and perform a measurement. The measurement may consist of one or more of a three-dimensional surface gradient analysis, a hue analysis, a saturation analysis, etc. The imaging device 100 may trace the three-dimensional surface gradient analysis and determine an edge of the wound.

The imaging device 100 may determine a wound boundary. The imaging device 100 may determine the wound boundary by selecting the wound boundary from an object boundary on a pixel-by-pixel basis. The wound boundary may be selected according to:

$$\text{boundary}_{3D}(i) = \text{argmin}\{\text{distance}(T\text{gradient}_{3D}, \text{boundary}_{color}(i))\}, \forall i \in \text{boundary}_{color}$$

where, $T\text{gradient}_{3D}$ is a pixel vector of a thresholded surface gradient and $\text{boundary}_{3D}$ (i) is a pixel chosen from $T\text{gradient}_{3D}$ with a shortest Euclidean distance to $\text{boundary}_{color}(i)$ on a 2D plane. The imaging device 100 may determine a wound region by analyzing a change in a segment's perimeter and area. When the segment shrinks to fit the wound boundary and does not overlap with the wound region, the area change may be small and the perimeter may be decreasing or slightly increasing. Once the segment boundary enters into the wound region, which may indicate a poor segmentation, the area may have significantly changed and the length of the boundary may have increased.

Figure 4B:
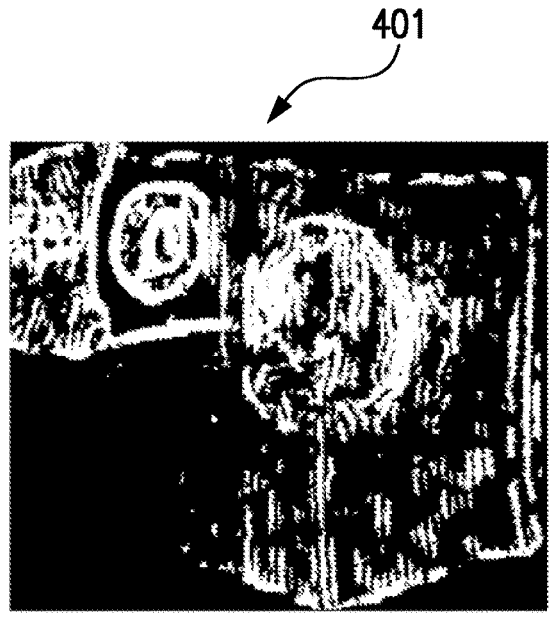
FIG. 4B shows an example surface gradient segment.

FIG. 4B shows an example surface gradient image. The imaging device 100 may generate the surface gradient image. The surface gradient image may indicate a wound region (e.g., a region of interest, a wound boundary). The boundary of the wound region may be determined as the three-dimensional wound edge based on a significant surface gradient associated with the wound bed. For example, the borders between the wound bed and the skin around the wound may exhibit a change in surface normal. For example, the proximity sensor 340G may determine that for any given area (e.g., a field), over a length (e.g., width or height), the distance from the proximity sensor 340G to the wound changes (e.g., by 1 mm per mm). For example, the proximity sensor 340G may determine one or more points (e.g., one or more point clouds). The imaging device 100 may determine one or more faces (a face of the one or more faces may comprise one or more point clouds). The imaging device 100 may determine an average of all normal from any connected faces. A maximum difference between a point cloud and neighboring point clouds may be determined. The point cloud and the neighboring point clouds may be linked by the one or more faces. The maximum difference may be mapped to a 2D image which may result in the generation of a gradient map (Gradient). Pixels of Gradient may be considered as edges of the 3D image if they are larger than a threshold (e.g., greater than 1 mm/mm). Any threshold gradient may be used.

Figure 4C:
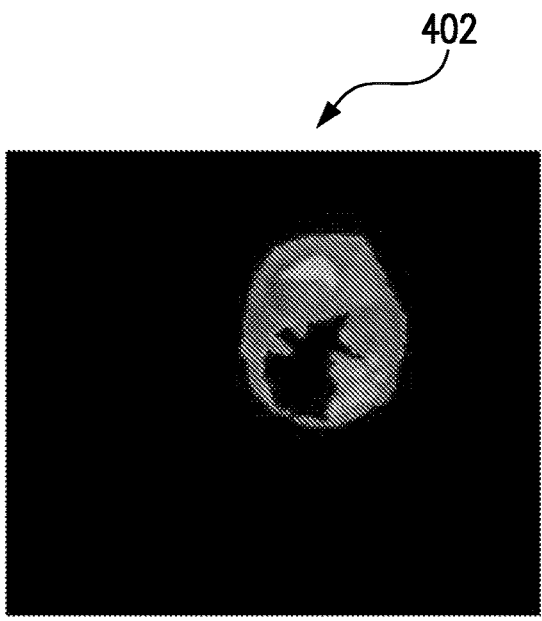
FIG. 4C shows an example image segment.

FIG. 4C shows an example generated wound color segmentation. The generated wound color segmentation may indicate a boundary or border or perimeter of the wound region as well as an area of the wound region. The color segmentation may comprise classifying one or more pixels. For example, a hue and saturation difference for each pixel of the one or more pixels may be determined. The hue may comprise a color (e.g., red, green, blue, etc. . . . ) while the saturation difference may indicate a difference in saturation between the pixel and the approximated center. As such, each pixel may be associated with at least one ordered pair of (hue, $\text{sat}_{\text{diff}}$) as well as a classification (wound, not wound). A color table may be generated. The x-axis of the color table may indicate hue while the y-axis indicates $\text{sat}_{\text{diff}}$. As such, each cell in the table may represent a pixel in the image and thereby indicate a classification of wound ($T_{img}^{wound}$) or not wound ($T_{img}^{not\ wound}$). As such:

$$T_{all}^{wound}(\text{hue}, \text{sat}_{\text{diff}}) = \sum\nolimits_{img \in training} \left(T_{img}^{wound}(\text{hue}, \text{sat}_{\text{diff}}) - T_{img}^{not\ wound}(\text{hue}, \text{sat}_{\text{diff}})\right)$$

Likewise, pixels associated with an ambiguous hue may be designated as noise according to:

$$T_{all}^{wound}(\text{hue}, \text{sat}_{\text{diff}}) = 0, \text{if } |T_{all}^{wound}(\text{hue}, \text{sat}_{\text{diff}})| < \text{threshold}$$

For example a color (hue, $\text{sat}_{\text{diff}}$) is considered as wound if $T_{all}^{wound}(\text{hue}, \text{sat}_{\text{diff}})$ is positive. For example, the color (hue, $\text{sat}_{\text{diff}}$) is considered as not wound if $T_{all}^{wound}(\text{hue}, \text{sat}_{\text{diff}})$ is negative. For example, (hue, $\text{sat}_{\text{diff}}$) is considered as noise if $T_{all}^{wound}(\text{hue}, \text{sat}_{\text{diff}}) = 0$. Wound segmentation may incorporate a K-nearest-neighbor classifier wherein the color (hue, $\text{sat}_{\text{diff}}$) of each pixel in the image finds K-nearest non-zero cells (K) in $T_{all}^{wound}$. For example:

$$Sum^{wound}(\text{hue}, \text{sat}_{\text{diff}}) = \sum\nolimits_{k \in K} T_{all}(\text{hue}^k, \text{sat}_{\text{diff}}^k) \text{ and}$$

$$Seg^{wound}(x, y) = \begin{cases} 0 \text{ (not wound)}, & \text{if } Sum(\text{hue}, \text{sat}_{\text{diff}}) \leq 0 \\ 1 \text{ (wound)}, & \text{if } Sum(\text{hue}, \text{sat}_{\text{diff}}) > 0 \end{cases}$$

where $Seg^{wound}$ is the segmentation of the testing (training) image. With different K, multiple segmentations may be generated. As such, each pixel may be associated with one or more ordered pairs of (hue, $\text{sat}_{\text{diff}}$) and one or more classifications (wound, not wound) and/or (skin, not skin). For example, in a manner similar to the above, each pixel in the image may be classified as skin or not skin. For example, by replacing the color tables of wound ($T_{img}^{wound}$) and not wound ($T_{img}^{not\ wound}$) with tables of skin ($T_{img}^{skin}$) and not skin ($T_{img}^{not\ skin}$), a skin segmentation ($Seg^{skin}$) may be determined.

The imaging device 100 may determine a wound region by analyzing a hue associated one or more pixels of the image. When the segment shrinks to fit the wound boundary and does not overlap with the wound region, the area change may be small and the perimeter may be decreasing or slightly increasing. Once the segment boundary enters into the wound region, which may indicate a poor segmentation, the area may have significantly changed and the length of the boundary may have increased.

Figure 4D:
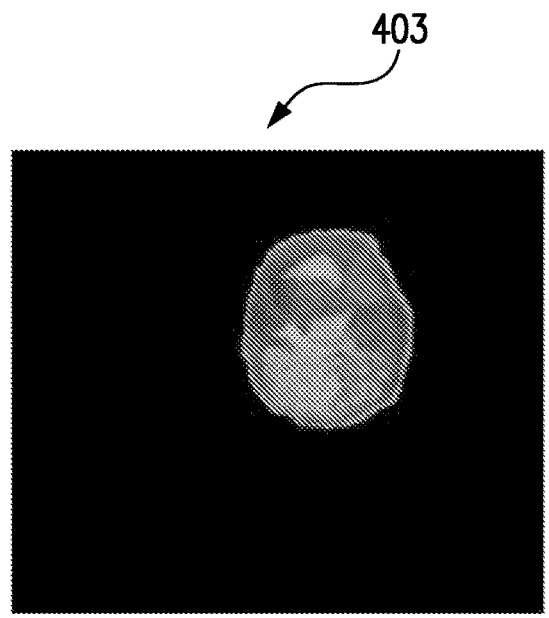
FIG. 4D shows an example image segment.

FIG. 4D shows an example selected wound segmentation. The selected wound segmentation may indicate a boundary or border or perimeter of the wound region as well as an area of the wound region. The selected wound segmentation may be automatically selected by the imaging device 100 via analyzing the change of the segment's perimeter and area. In another embodiment, one or more wound segmentations may be determined and a user may select one or more of the one or more wound segmentations.

Figure 5A:
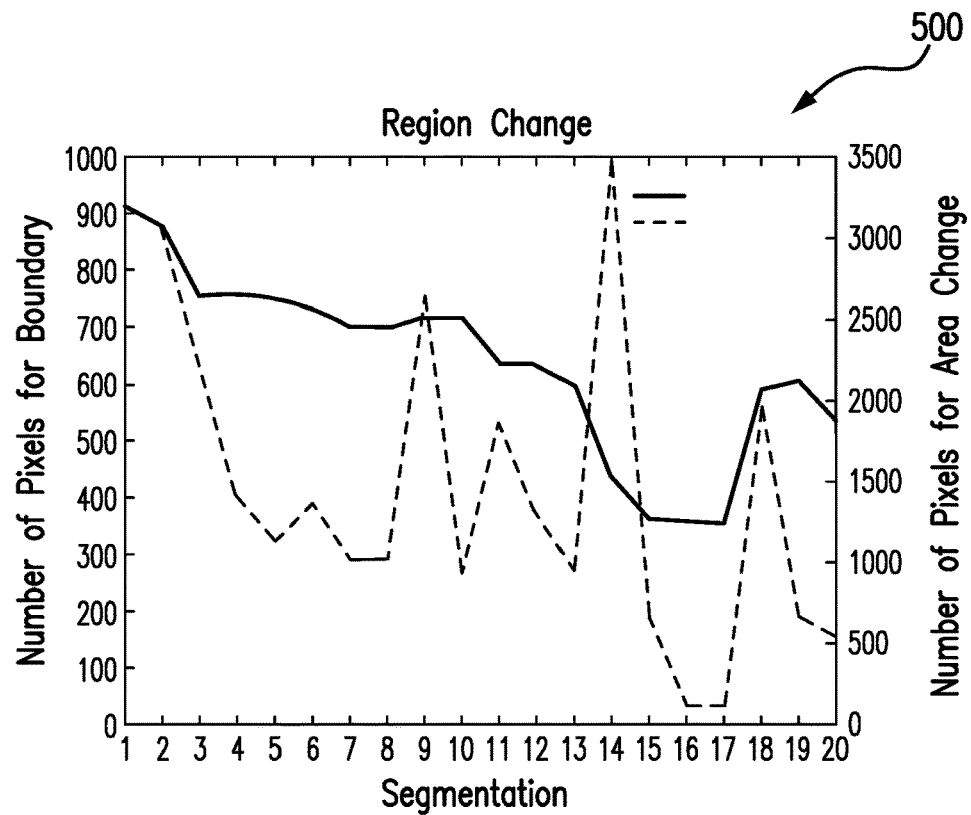
FIG. 5A shows an example graph.
Figure 5B:
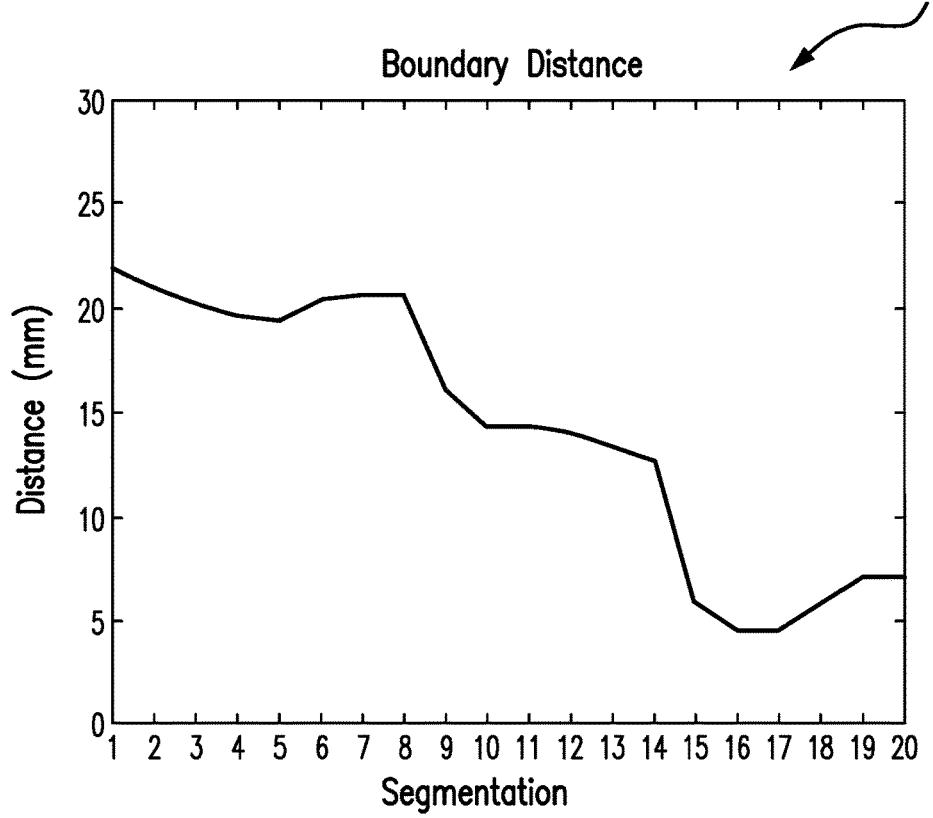
FIG. 5B shows an example graph.

Turning now to FIGS. 5A-5B, example graphs 500 and 501 are shown. The graphs 500 and 501 may be based on results of analysis performed on the boundary and area of the wound shown in FIGS. 4A-4D. FIG. 5A shows an example region change graph. The area change (dotted line) and the length of boundary (solid line) of the wound region with different segmentations are shown. Circles on an x-axis of the graphs 500 and 501 represent regions with increased area change. Crosses on the x-axis of the graphs 500 and 501 indicate an increased boundary. The regions with both a circle and a cross represent potential segmentations. The graph 501 shown in FIG. 5B may be an example boundary distance graph. The graph 501 plots a maximum paired boundary distance with different segmentations. The boundary distance may represent a pairing of boundary hue and boundary gradient (boundary$_{color}$(i), boundary$_{3D}$(i)). For example, the maximum paired boundary difference may be small if the selected segment is a good segmentation of the wound. For example, two potential segmentations are marked with a star on the x-axis of the graph 301; the star with the smallest maximum distance may be selected (segmentation 17 is selected).

Figure 6:
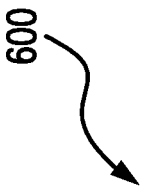
FIG. 6 shows an example data table.

Turning now to FIG. 6, an example data table 600 is shown. Data in the data table 600 may comprise measurement results or the like and combinations thereof. The data in the data table 600 may comprise measurements such as length, width, depth and the like and combinations thereof. Measurements may be in units such as millimeters, centimeters, inches, or any other suitable unit. The data in the data table 600 may include mean values, standard deviation values (STD), average values, average absolute error, error rates, average error rates, p-values and the like and combinations thereof. The data in the data table 600 may be generated by taking measurements of simulated wounds on mannequins, on patients, etc. The data in the data table 600 may be generated by measuring more than one wound. For example, data may be generated by measuring wounds of various sizes and severities. In generating data, a ground truth may be determined. The ground truth may comprise information discerned from observation. The ground truth may be measured. A statistical significance may be determined. For example, the Wilcoxon Signed-Rank Test may be used to test for statistical significance at the 95% confidence level between repeated-measures of wounds using PrUMS and the ground truth. The length and width measurements of a wound may or may not show significant difference from the ground truth. The depth measurement of a wound may or may not show significant difference from the ground truth.

Figure 7A:
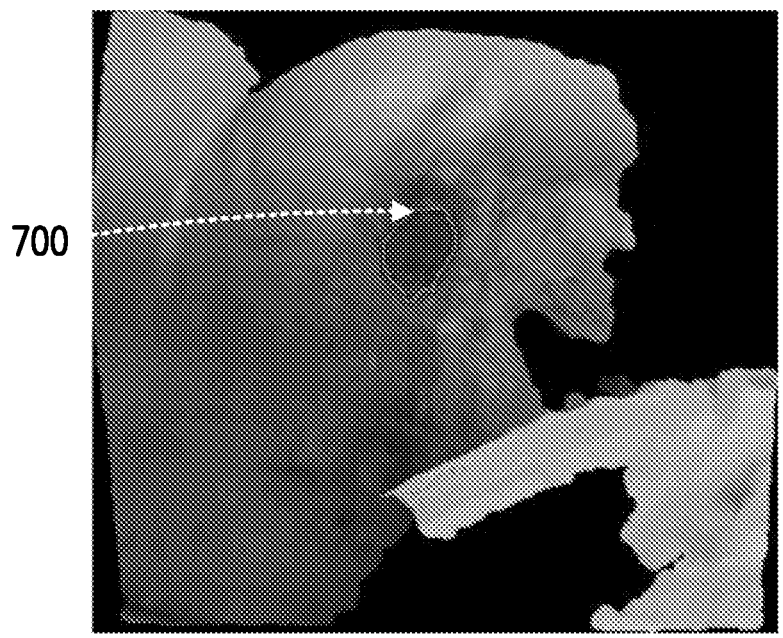
FIG. 7A shows an example three-dimensional image.
Figure 7B:
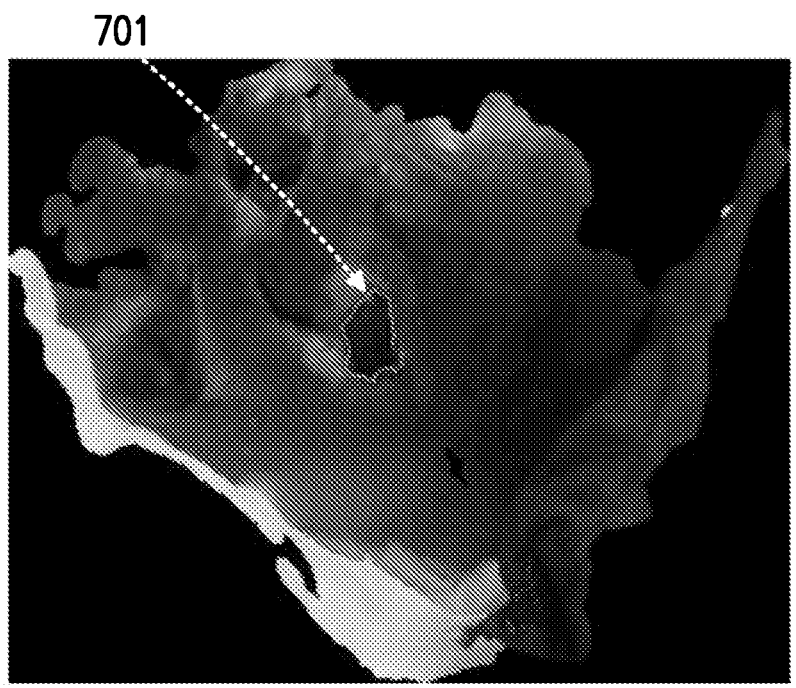
FIG. 7B shows an example three-dimensional image.

Turning now to FIGS. 7A-7B, example wound boundaries are shown. FIG. 7A shows an example wound boundary determination 700 over the ilial-crest. FIG. 7B shows an example wound boundary determination over the sacrum-coccyx. In each of the figures, the solid line may outline the PrUMS wound boundary of the targeted PrUs.

Figure 8:
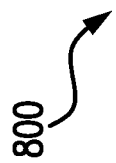
FIG. 8 shows an example data table.

Turning now to FIG. 8, an example data table 800 is shown. Data in the data table 800 may comprise measurement results or the like and combinations thereof. The data in the data table 800 may comprise measurements such as length, width, depth and the like and combinations thereof. Data may include mean values, standard deviation values (STD), average values, average absolute error, error rates, average error rates, p-values and the like and combinations thereof. Data may be generated by taking measurements of simulated wounds on mannequins. Data may be generated by taking measurements of wounds on patients. Data may be generated by measuring more than one wound. For example, data may be generated by measuring wounds of various sizes and severities.

Figure 9:
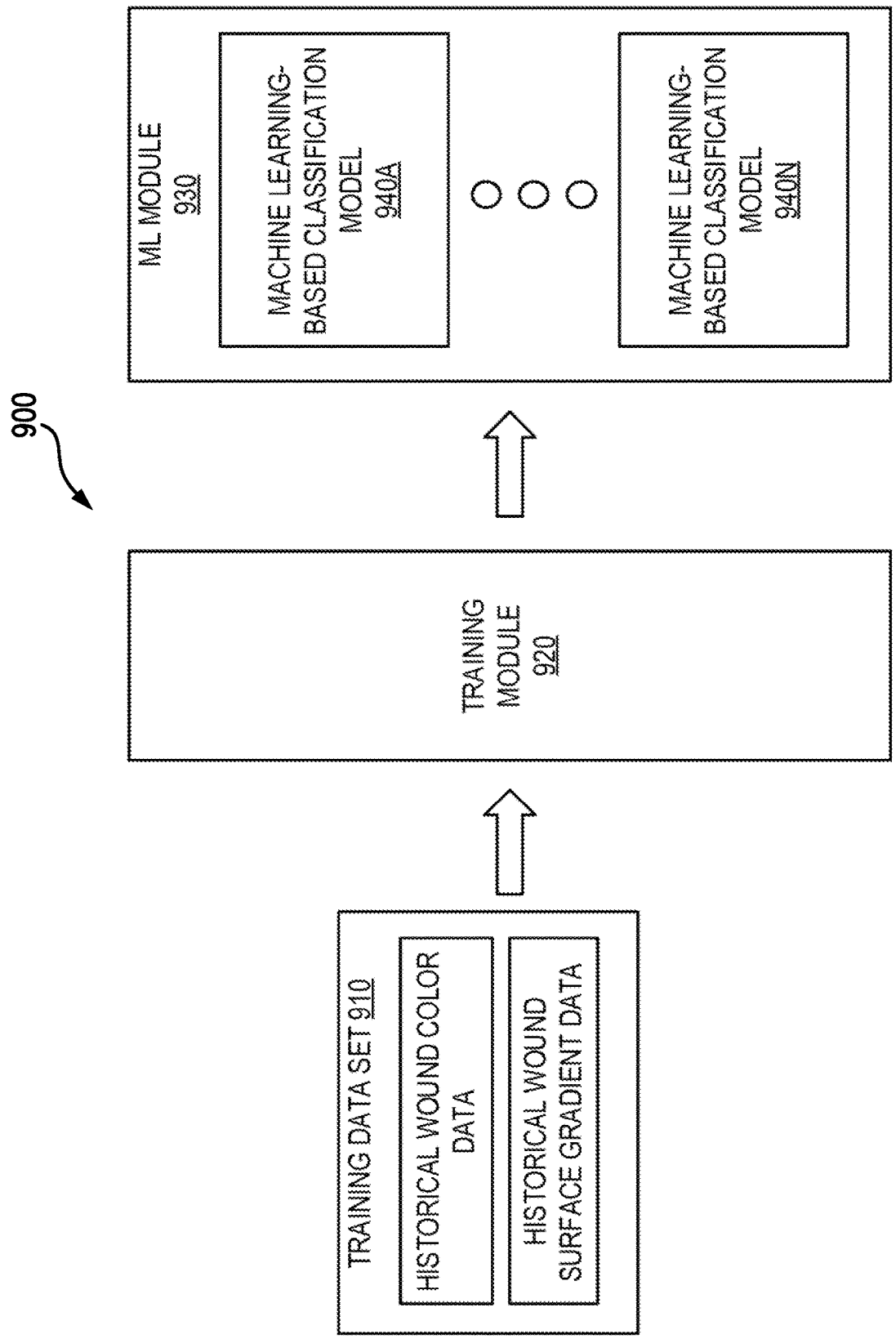
FIG. 9 shows an example method.

Turning now to FIG. 9, methods are described for generating a predictive model (e.g., a model to segment an image and classify a wound). The methods described may use machine learning ("ML") techniques to train, based on an analysis of one or more training data sets 910 by a training module 920, at least one ML module 930 that is configured to segment an image and classify a wound. The training data set 910 may comprise one or more of historical wound color data, historical wound surface gradient data, and historical wound boundary data (together historical wound data).

A subset of the historical wound color data, the historical wound surface gradient data, or the historical wound boundary data may be randomly assigned to the training data set 910 or to a testing data set. In some implementations, the assignment of data to a training data set or a testing data set may not be completely random. In this case, one or more criteria may be used during the assignment. In general, any suitable method may be used to assign the data to the training or testing data sets, while ensuring that the distributions of yes and no labels are somewhat similar in the training data set and the testing data set.

The training module 920 may train the ML module 930 by extracting a feature set from a plurality of images in which an image was manually segmented so as to determine a wound area in the training data set 910 according to one or more feature selection techniques. The training module 920 may train the ML module 930 by extracting a feature set from the training data set 910 that includes statistically significant features of positive examples (e.g., labeled as being yes) and statistically significant features of negative examples (e.g., labeled as being no).

The training module 920 may extract a feature set from the training data set 910 in a variety of ways. The training module 920 may perform feature extraction multiple times, each time using a different feature-extraction technique. In an example, the feature sets generated using the different techniques may each be used to generate different machine learning-based classification models 940. For example, the feature set with the highest quality metrics may be selected for use in training. The training module 920 may use the feature set(s) to build one or more machine learning-based classification models 940A-940N that are configured to segment an image and classify a wound.

The training data set 910 may be analyzed to determine any dependencies, associations, and/or correlations between features and the yes/no labels in the training data set 910. The identified correlations may have the form of a list of features that are associated with different yes/no labels. The term "feature," as used herein, may refer to any characteristic of an item of data that may be used to determine whether the item of data falls within one or more specific categories.

In an embodiment, a feature selection technique may be used which may comprise one or more feature selection rules. The one or more feature selection rules may comprise a feature occurrence rule. The feature occurrence rule may comprise determining which features in the training data set 910 occur over a threshold number of times and identifying those features that satisfy the threshold as features.

A single feature selection rule may be applied to select features or multiple feature selection rules may be applied to select features. The feature selection rules may be applied in a cascading fashion, with the feature selection rules being applied in a specific order and applied to the results of the previous rule. For example, the feature occurrence rule may be applied to the training data set 910 to generate a first list of features. A final list of features may be analyzed according to additional feature selection techniques to determine one or more feature groups (e.g., groups of features that may be used to predict optimal quantity status). Any suitable computational technique may be used to identify the feature groups using any feature selection technique such as filter, wrapper, and/or embedded methods. One or more feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., yes/no).

As another example, one or more feature groups may be selected according to a wrapper method. A wrapper method may be configured to use a subset of features and train a machine learning model using the subset of features. Based on the inferences drawn from a previous model, features may be added and/or deleted from the subset. Wrapper methods include, for example, forward feature selection, backward feature elimination, recursive feature elimination, combinations thereof, and the like. As an example, forward feature selection may be used to identify one or more feature groups. Forward feature selection is an iterative method that begins with no feature in the machine learning model. In each iteration, the feature which best improves the model is added until an addition of a new variable does not improve the performance of the machine learning model. As an example, backward elimination may be used to identify one or more feature groups. Backward elimination is an iterative method that begins with all features in the machine learning model. In each iteration, the least significant feature is removed until no improvement is observed on removal of features. Recursive feature elimination may be used to identify one or more feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 920 has generated a feature set(s), the training module 920 may generate a machine learning-based classification model 940 based on the feature set(s). A machine learning-based classification model may refer to a complex mathematical model for data classification that is generated using machine-learning techniques. In one example, the machine learning-based classification model 940 may include a map of support vectors that represent boundary features. By way of example, boundary features may be selected from, and/or represent the highest-ranked features in a feature set.

The training module 920 may use the feature sets determined or extracted from the training data set 910 to build a machine learning-based classification model 940A-940N for each classification category (e.g., yes, no). In some examples, the machine learning-based classification models 940A-940N may be combined into a single machine learning-based classification model 990. Similarly, the ML module 930 may represent a single classifier containing a single or a plurality of machine learning-based classification models 940 and/or multiple classifiers containing a single or a plurality of machine learning-based classification models 940.

The features may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting ML module 930 may comprise a decision rule or a mapping for each feature to assign an optimized status to a quantity of sporting licenses to be issued.

In an embodiment, the training module 920 may train the machine learning-based classification models 940 as a convolutional neural network (CNN). The CNN comprises at least one convolutional feature layer and three fully connected layers leading to a final classification layer (softmax). The final classification layer may finally be applied to combine the outputs of the fully connected layers using softmax functions as is known in the art.

The feature(s) and the ML module 930 may be used to segment an image and determine a wound area in the testing data set. In one example, the determination of the wound area (e.g., surface area and boundary) includes a confidence level. The confidence level may be a value between zero and one, and it may represent a likelihood that a given area of the image is correctly classified as a wound (e.g., yes) or not a wound (e.g., no). Conversely, the ML module 430 may segment the image and determine the wound area by determining a likelihood that the given area of the image is correctly classified as skin (e.g., yes) or not skin (e.g., no). In one example, when there are two statuses (e.g., yes and no), the confidence level may correspond to a value p, which refers to a likelihood that a given area (e.g., a pixel or group of pixels) belongs to the first status (e.g., yes). In this case, the value 1−p may refer to a likelihood that the given area belongs to the second status (e.g., no). In general, multiple confidence levels may be provided for each area of an image (or entire image) in the testing data set and for each feature when there are more than two statuses. A top performing feature may be determined by comparing the result obtained for image segmentation wound classification with the known yes/no wound or skin classification. In general, the top performing feature will have results that closely match the known yes/no statuses. The top performing feature(s) may be used to predict the yes/no status of a segment of the image. For example, historical wound data (e.g., images which have already been segmented and classified) may be determined/received and a predicted image segmentation and wound classification may be determined. The predicted image segmentation and wound classification may be provided to the ML module 930 which may, based on the top performing feature(s), classify the image segmentation as either a wound (yes) or not a wound quantity (no). Conversely, the predicted image segmentation and skin classification may be provided to the ML module 930 which may, based on the top performing feature(s), classify the image segmentation as either skin (yes), or not skin (no).

Figure 10:
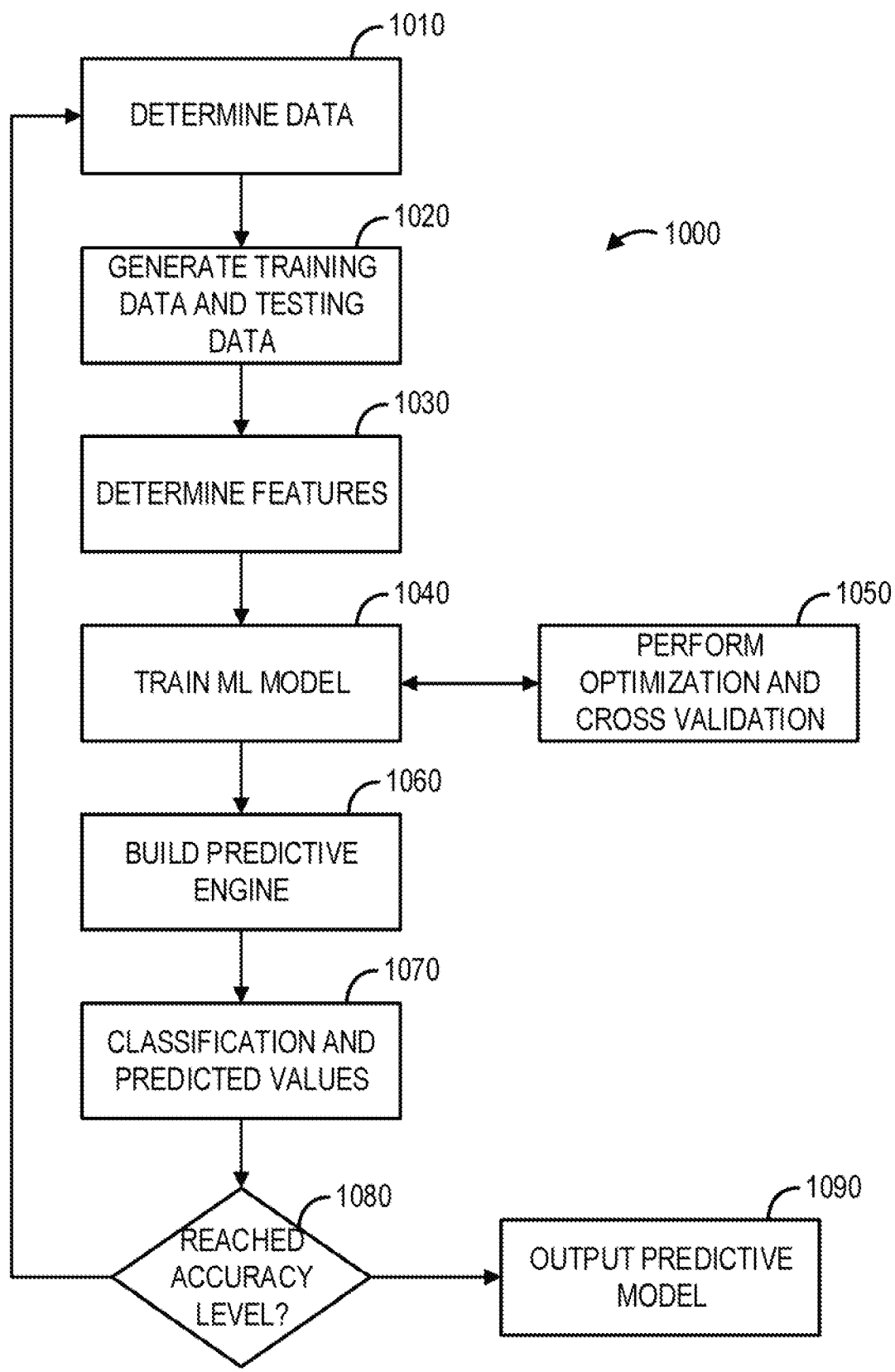
FIG. 10 shows an example method.

FIG. 10 is a flowchart illustrating an example training method 1000 for generating the ML module 930 using the training module 920. The training module 920 can implement supervised, unsupervised, and/or semi-supervised (e.g., reinforcement based) machine learning-based classification models 940. The method 1000 illustrated in FIG. 10 is an example of a supervised learning method; variations of this example of training method are discussed below, however, other training methods can be analogously implemented to train unsupervised and/or semi-supervised machine learning models.

The training method 1000 may determine (e.g., access, receive, retrieve, etc.) first historical data at step 1010. The historical data may comprise a labeled set of historical wound data (e.g., historical wound color data, historical wound surface gradient data, historical wound boundary data, historical wound classification data, combinations thereof, and the like). The labels may correspond to a wound classification status (e.g., yes or no). The labels may correspond to a skin classification status (e.g., yes or no).

The training method 1000 may generate, at step 1020, a training data set and a testing data set. The training data set and the testing data set may be generated by randomly assigning labeled historical data to either the training data set or the testing data set. In some implementations, the assignment of labeled historical data as training or testing data may not be completely random. As an example, a majority of the labeled historical data may be used to generate the training data set. For example, 75% of the labeled historical data may be used to generate the training data set and 25% may be used to generate the testing data set. In another example, 80% of the labeled historical data may be used to generate the training data set and 20% may be used to generate the testing data set.

The training method 1000 may determine (e.g., extract, select, etc.), at step 1030, one or more features that can be used by, for example, a classifier to differentiate among different wound classification or skin classification (e.g., yes vs. no). As an example, the training method 1000 may determine a set of features from the labeled historical data. In a further example, a set of features may be determined from labeled historical data different than the labeled historical data in either the training data set or the testing data set. In other words, labeled historical data may be used for feature determination, rather than for training a machine learning model. Such labeled historical data may be used to determine an initial set of features, which may be further reduced using the training data set. By way of example, the features described herein may comprise one or more of historical wound data (e.g., historical wound color data, historical wound surface gradient data, historical wound boundary data, combinations thereof, and the like).

Continuing in FIG. 10, the training method 1000 may train one or more machine learning models using the one or more features at step 1040. In one example, the machine learning models may be trained using supervised learning. In another example, other machine learning techniques may be employed, including unsupervised learning and semi-supervised. The machine learning models trained at 1040 may be selected based on different criteria depending on the problem to be solved and/or data available in the training data set. For example, machine learning classifiers can suffer from different degrees of bias. Accordingly, more than one machine learning model can be trained at 1040, optimized, improved, and cross-validated at step 1050.

The training method 1000 may select one or more machine learning models to build a predictive model at 1060. The predictive model may be evaluated using the testing data set. The predictive model may analyze the testing data set and generate classifications at step 1070. Predicted classifications may be evaluated at step 1080 to determine whether such values have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified an area of an image as a wound that was in reality not a wound. Conversely, the false negatives of the predictive model may refer to a number of times the machine learning model classified an area of the image as not a wound when, in fact, the area of the image was a wound. True negatives and true positives may refer to a number of times the predictive model correctly classified one or more areas of the image (e.g., a pixel, group of pixels, or an entire image) as a wound or not a wound. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model (e.g., the ML module 930) may be output at step 1090; when the desired accuracy level is not reached, however, then a subsequent iteration of the training method 1000 may be performed starting at step 1010 with variations such as, for example, considering a larger collection of historical data.

Figure 11:
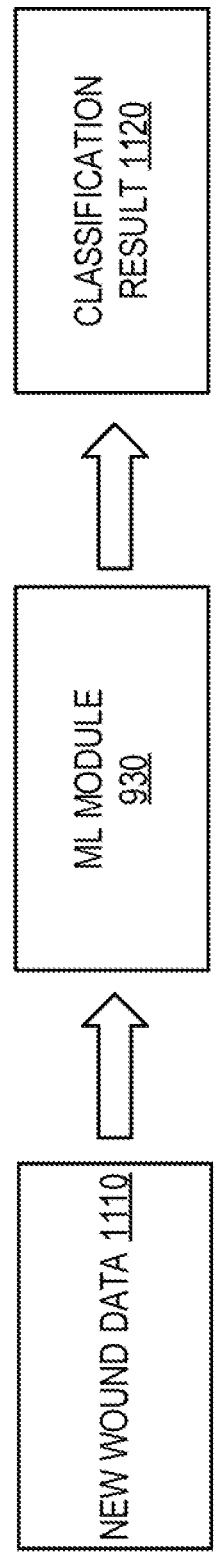
FIG. 11 shows an example method.

FIG. 11 is an illustration of an exemplary process flow for using a machine learning-based classifier to segment an image and determine a wound area classification result 1120. As illustrated in FIG. 11, new wound data 1110 may be provided as input to the ML module 930. New wound data 1110 may comprise an image of a wound. For example, the new wound data 1110 may comprise new wound image data, new wound color data, new wound surface gradient data, new wound boundary data, combinations thereof, and the like. The ML module 930 may process the new wound data 1110 using a machine learning-based classifier(s) to arrive at an image segmentation and wound classification.

The classification result 1120 may identify one or more characteristics of the new wound data 1110. For example, the recommendation result 1120 may identify a feature in the new wound data such as a particularly deep wound bed (e.g., by identifying an exposed bone or organ).

Figure 12A:
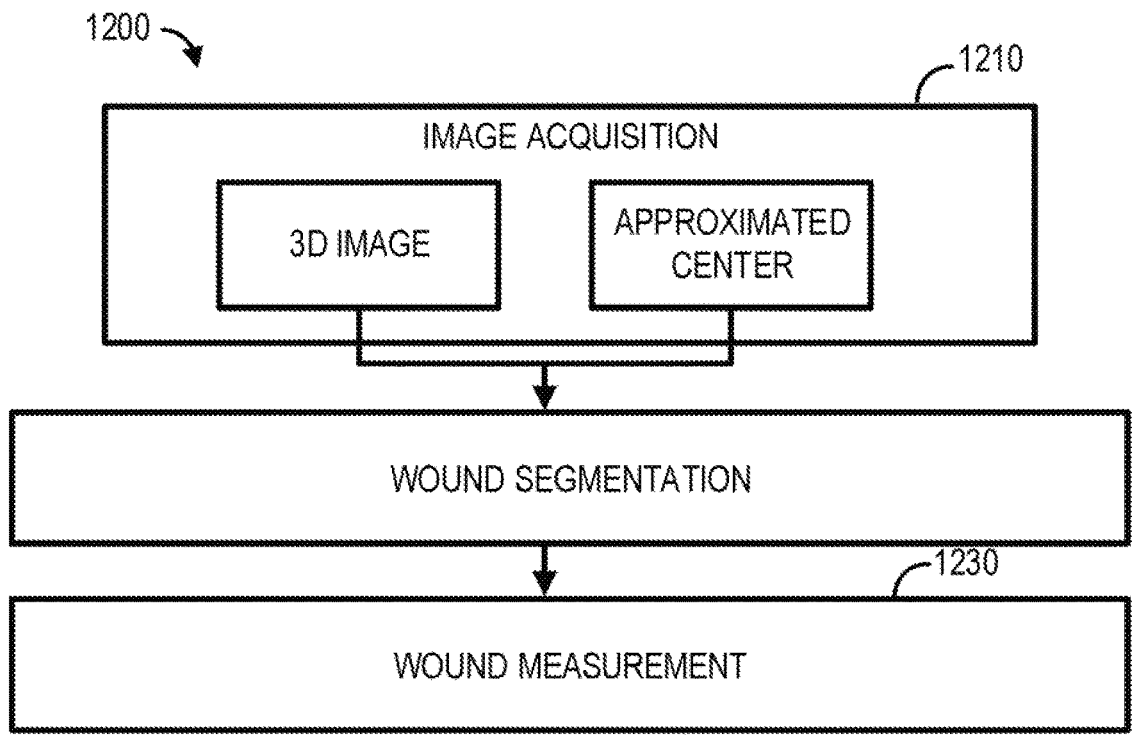
FIG. 12A shows an example process flow.
Figure 12B:
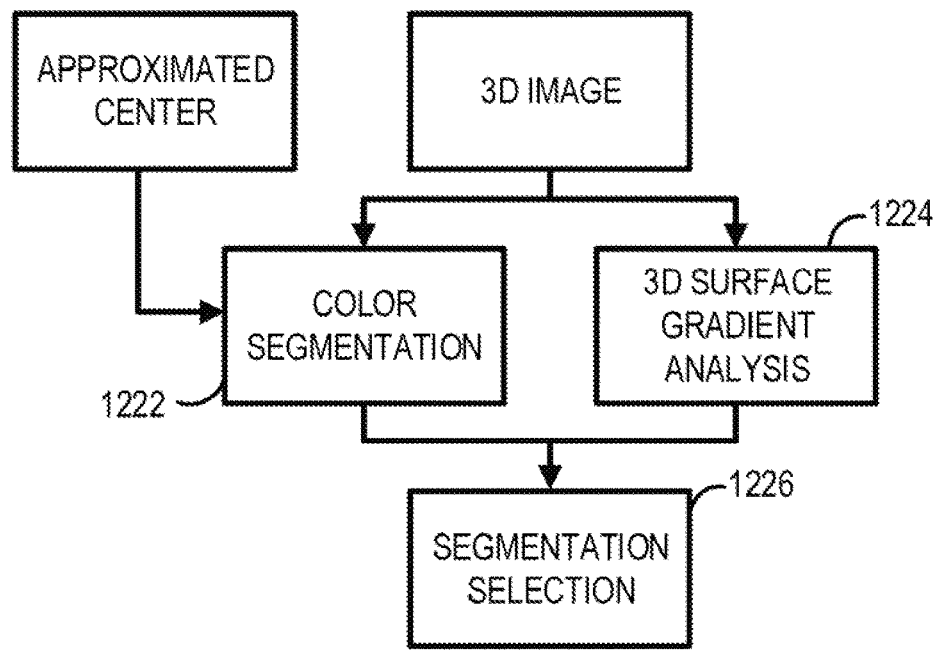
FIG. 12B shows an example process flow.

FIGS. 12A and 12B show an example system flow. At 1210 an image may be acquired. The image may be acquired (e.g., captured, received, determined) by the imaging device 100 and/or the electronic device 301 (which may be the same device). The image may comprise an image of a wound. For example, camera module 391 may capture the image. Likewise, the proximity sensor 340G may capture the image. The proximity sensor 340G may capture the image by scanning the image and determining, for any given point in the field of view of the proximity sensor 340G, a distance between the wound (including the skin around the wound) and the proximity sensor 340G. For example, the image may comprise a color image (e.g., an RGB image), a depth image, combinations thereof (e.g., and RGB-D image), and the like. The image may be a 2D image and/or a 3D image. An approximated center may be determined. The approximated center may be determined manually or automatically. For example, a user may designate an approximated center of the image. Likewise, the imaging device 100 may determine the approximated center. The approximated center may be designated by an indicator such as a target or a ruler.

At 1220 a wound segmentation may be performed. Wound segmentation is further described with reference to FIG. 12B. The wound segmentation may comprise one or more of a color segmentation and/or a gradient segmentation. The wound segmentation may be repeated. At 1222, color segmentation may be performed. The color segmentation may comprise classifying one or more pixels. For example, a hue and saturation difference for each pixel of the one or more pixels may be determined. The hue may comprise a color (e.g., red, green, blue, etc. . . . ) while the saturation difference may indicate a difference in saturation between the pixel and the approximated center. As such, each pixel may be associated with at least one ordered pair of (hue, $sat_{diff}$) as well as a classification (wound, not wound). A color table may be generated. The x-axis of the color table may indicate hue while the y-axis indicates $sat_{diff}$. As such, each cell in the table may represent a pixel in the image and thereby indicate a classification of wound ($T_{img}^{wound}$) or not wound ($T_{img}^{not\ wound}$). As such:

$$T_{all}^{wound}(\text{hue},sat_{diff}) = \Sigma_{img \in training}(T_{img}^{wound}(\text{hue},sat_{diff}) - T_{img}^{not\ wound}(\text{hue},sat_{diff}))$$

Likewise, pixels associated with an ambiguous hue may be designated as noise according to:

$$T_{all}^{wound}(\text{hue},sat_{diff}) = 0, \text{if } |T_{all}^{wound}(\text{hue},sat_{diff})| > threshold$$

For example a color (hue, $sat_{diff}$) is considered as wound if $T_{all}^{wound}$(hue, $sat_{diff}$) is positive. For example, the color (hue, $sat_{diff}$) is considered as not wound if $T_{all}^{wound}$(hue, $sat_{diff}$) is negative. For example, (hue, $sat_{diff}$) is considered as noise $T_{all}^{wound}$(hue, $sat_{diff}$)=0. Wound segmentation may incorporate a K-nearest-neighbor classifier wherein the color (hue, $sat_{diff}$) of each pixel in the image finds K-nearest non-zero cells (K) in $T_{all}^{wound}$. For example:

$$Sum^{wound}(\text{hue}, sat_{diff}) = \sum_{k \in K} T_{all}(hue^k, sat_{diff}^k) \text{ and}$$

$$Seg^{wound}(x, y) = \begin{cases} 0 \text{ (not wound), if } Sum(\text{hue}, sat_{diff}) \leq 0 \\ 1 \text{ (wound), if } Sum(\text{hue}, sat_{diff}) > 0 \end{cases}$$

where $Seg^{wound}$ is the segmentation of the testing (training) image. With different K, multiple segmentations may be generated. As such, each pixel may be associated with one or more ordered pairs of (hue,$sat_{diff}$) and one or more classifications (wound, not wound) and/or (skin, not skin). For example, in a manner similar to the above, each pixel in the image may be classified as skin or not skin. For example, by replacing the color tables of wound ($T_{img}^{wound}$) and not wound ($T_{img}^{not\ wound}$) with tables of skin ($T_{img}^{skin}$) and not skin ($T_{img}^{not\ skin}$), a skin segmentation ($Seg^{skin}$) may be determined.

Likewise, at 1224, a 3D surface gradient segmentation may be performed. For example, the image may be segmented according to surface gradient (e.g., 3D surface gradient analysis). For example, the borders between the wound bed and the skin around the wound may exhibit a change in surface normal. For example, the proximity sensor 340G may determine that for any given area (e.g., a field), over a length (e.g., width or height), the distance from the proximity sensor 340G to the wound changes (e.g., by 1 mm/mm). For example, the proximity sensor 340G may determine one or more points (e.g., one or more point clouds). The imaging device 100 may determine one or more faces (a face of the one or more faces may comprise one or more point clouds). The imaging device 100 may determine an average of all normal from any connected faces. A maximum difference between a point cloud and neighboring point clouds may be determined. The point cloud and the neighboring point clouds may be linked by the one or more faces. The maximum difference may be mapped to a 2D image which may result in the generation of a gradient map (Gradient). Pixels of Gradient may be considered as edges of the 3D image if they are larger than a threshold (e.g., greater than 1 mm/mm). Any threshold gradient may be used.

Multiple wound segmentations may be generated. Each of the one or more of the color segmentation and/or the gradient segmentation may be repeated. One or more of the multiple wound segmentations may be selected. The selected one or more wound segmentations may be selected automatically, semi-automatically, or manually. For example, the one or more segmentations wherein the color segmentation and the gradient segmentation have the lowest difference (most closely match) in 2D color segmentation and 3D gradient segmentation. For example where boundary$_{color}^k$ is a pixel vector of the boundary of a segmentation $Seg^K$, which is generated in color segmentation for a single image and where K indicates that the segmentation is generated with K neighbors, the wound boundary from 3D is found according to:

$$\text{boundary}_{3D}^K(i) = \text{argmin}\{distance(TGradient_{3D}, \text{boundary}_{color}^K(i))\}, \forall i \in \text{boundary}_{color}^K$$

Where each pixel in boundary$_{color}^K$(i) can find a corresponding pixel (boundary$_{3D}^K$(i)) in $TGradient_{3D}$ which has the minimum distance. Thus, by comparing the distance between (boundary$_{color}^K$(i)) and its corresponding pixel (boundary$_{3D}^K$(i)), a segmentation may be scored. The score may be determined according to:

$$score^k = \max \ i \in \text{boundary}_{color}^k \{distance(\text{boundary}_{color}^k(i), \text{boundary}_{3D}^K(i))\}$$

This, the score for each segmentation is the maximum distance between the pair (boundary$_{color}^k$(i), boundary$_{3D}^K$(i)). In a similar fashion, the one or more segmentations wherein the color segmentation and the gradient segmentation have the three lowest difference may be selected and presented to a user for final selection. For example, the three lowest difference segmentations may be displayed via the display 360. A user may interact with the display via, for example, the input device 350 to select one or more of the three lowest difference segmentations.

At 1226, a segmentation may be selected. The selected segmentation may be selected in a semi-automatic fashion. For example, a user may correct a segmentation by selecting another segmentation from the top three candidates. All segmentations may be sorted sequentially in a segmentation sequence (S) by score from smallest to largest. Each segmentation may also have a similarity score (indicating how similar the segmentation is to the previous or following segmentation). The similar score may be calculated as a Dice coefficient according to:

$$\text{similarity}_i = \frac{2|seg_i \cap seg_{i-1}|}{|seg_i| + |seg_{i-1}|}, i = 2, \ldots, \left\lceil \frac{K}{2} \right\rceil, \text{ and } Seg_i \in S$$

where $Seg_1$ is the automatically selected segmentation. The optional semi-automatic step may comprise selecting two other segmentations with $similarity_i$ lower than 0.9 from the beginning of S.

Figure 13:
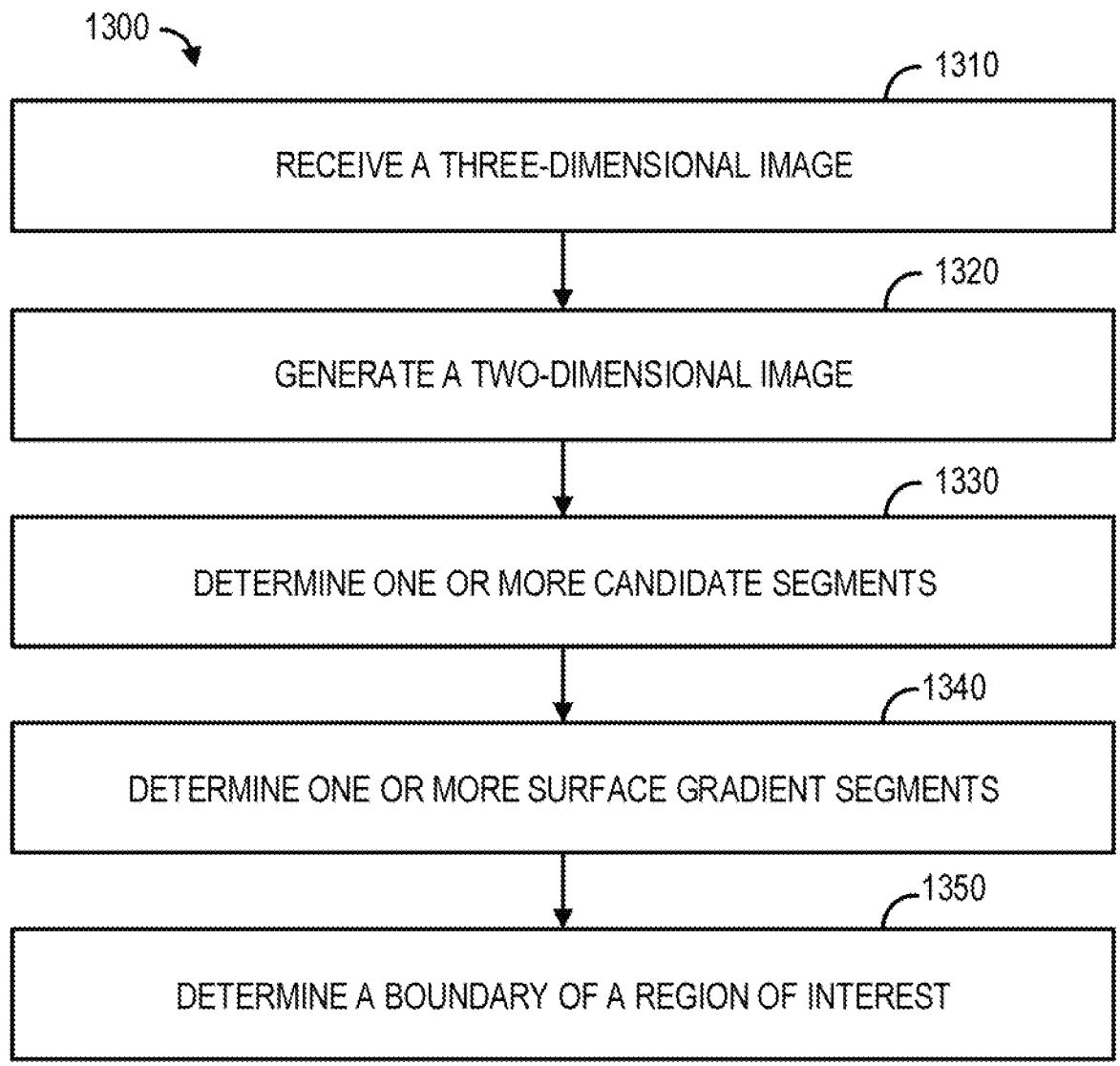
FIG. 13 shows an example method.

FIG. 13 shows a flowchart of an example method 1300 for imaging and analysis in accordance with the present description. Method 1300 may be implemented by the imaging device 100 shown in FIG. 1. The imaging device 100 may be a computing device. At step 1310, a computing device may receive a three-dimensional image. The computing device may receive a three-dimensional image based on an image captured by an imaging device. For example, the computing device may receive an image captured by a camera. The three-dimensional image may comprise a plurality of segments. The segments may be a uniform size or may vary in size. The size of the segments may range from a single pixel to more than one pixel. For example, the plurality of segments may comprise image segments. As another example, the plurality of segments may comprise surface gradient segments. The image segments may include colors, hues, saturation and the like. The surface gradient segments may be associated with a surface gradient.

At step 1320, the computing device may generate a two-dimensional image. The computing device may generate a two-dimensional image based on a three-dimensional image. The two dimensional image may comprise a plurality of image segments. The image segments may be associated with one or more colors, hues, saturations and the like.

At step 1330, the computing device may determine one or more candidate segments. The computing device may determine the one or more candidate segments based on a three-dimensional image. The computing device may determine one or more candidate segments based on a two-dimensional image. The candidate segments may be combined with the surface gradient segments. A candidate segment may be selected by a user. A candidate segment may be selected by an algorithm.

At step 1340, the computing device may determine one or more surface gradient segments. The computing device may determine the one or more surface gradient segments based on a two-dimensional image. The computing device may determine one or more surface gradient segments based on a three-dimensional image. To automatically select a segmented wound region to perform measurement, a 3D surface gradient analysis as described herein may be performed. A test may compare two related wounds, matched wounds, or repeated measurements of a single wound. As orientation may change significantly at the wound border, the surface gradient of the 3D model may be traced by the computing device and thresholded as a 3D edge automatically. The same 3D to 2D mapping process of the color image may be performed to the thresholded surface gradient. The wound boundary from the 3D surface gradient is selected from the object boundary pixel by pixel using, $TGradient_{3D}$ is the pixel vector of the thresholded surface gradient and $boundary_{3D}(i)$ is the pixel chosen from $TGradient_{3D}$ with the shortest Euclidean distance to $boundary_{color}(i)$ on the 2D plane.

At step 1350, the computing device may determine a boundary of a region of interest. The computing device may determine a boundary of a region of interest by determining a paired boundary. The computing device may determine a boundary region of interest based on at least one of a surface gradient segment, an image segment, or a candidate segment, or a combination thereof. The computing device may determine the boundary based on algorithm or equation or the like.

Figure 14:
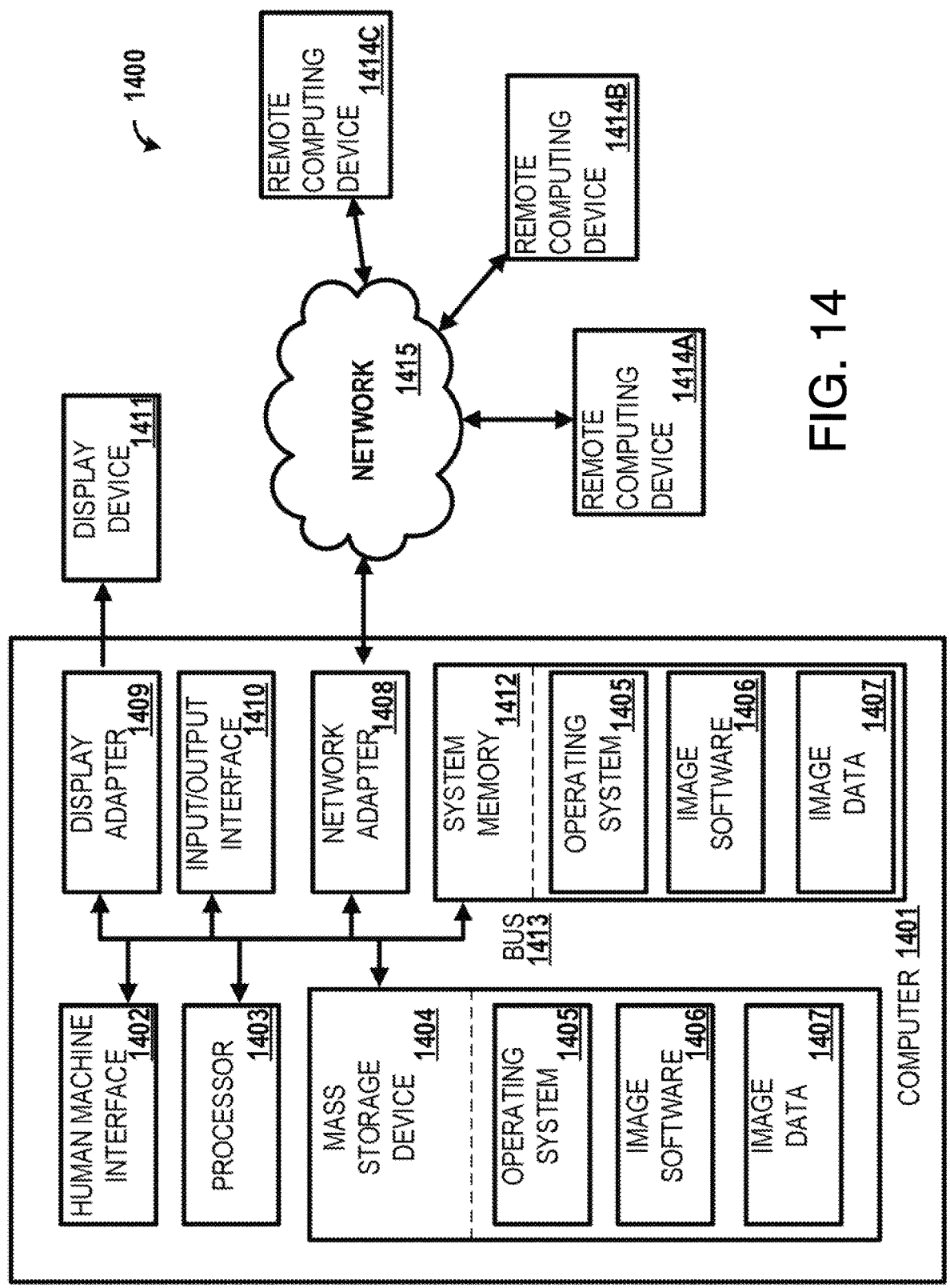
FIG. 14 show a block diagram of an example computing device.

FIG. 14 shows a system 1400 for imaging and analysis in accordance with the present description. The imaging device 100 may be a computer 1401 as shown in FIG. 14. The computer 1401 may comprise one or more processors 1403, a system memory 1412, and a bus 1413 that couples various system components including the one or more processors 1403 to the system memory 1412. In the case of multiple processors 1403, the computer 1401 may utilize parallel computing. The bus 1413 is one or more of several possible types of bus structures, including a memory bus or memory controller, a peripheral bus, an accelerated graphics port, or local bus using any of a variety of bus architectures.

The computer 1401 may operate on and/or comprise a variety of computer readable media (e.g., non-transitory media). The readable media may be any available media that is accessible by the computer 1401 and may include both volatile and non-volatile media, removable and non-removable media. The system memory 1412 has computer readable media in the form of volatile memory, such as random access memory (RAM), and/or non-volatile memory, such as read only memory (ROM). The system memory 1412 may store data such as imaging data 1407 and/or program modules such as the operating system 1405 and imaging software 1406 that are accessible to and/or are operated on by the one or more processors 1403. The imaging data 1407 may include, for example, one or more hardware parameters and/or usage parameters as described herein. The imaging software 1406 may be used by the computer 1401 to cause one or more components of the computer 1401 (not shown) to perform a maintenance procedure as described herein.

The computer 1401 may also have other removable/non-removable, volatile/non-volatile computer storage media. FIG. 14 shows the mass storage device 1404 which may provide non-volatile storage of computer code, computer readable instructions, data structures, program modules, and other data for the computer 1401. The mass storage device 1404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1404, such as the operating system 1405 and the imaging software 1406. Each of the operating system 1405 and the imaging software 1406 (e.g., or some combination thereof) may have elements of the program modules and the imaging software 1406. The imaging data 1407 may also be stored on the mass storage device 1404. The imaging data 1407 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 1414. A user may enter commands and information into the computer 1401 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1403 via a human machine interface 1402 that is coupled to the bus 1413, but may be connected by other interface and bus structures, such as a parallel port, game port, an IEEE 1394

Port (also known as a Firewire port), a serial port, network adapter 1417, and/or a universal serial bus (USB).

The display device 1411 may also be connected to the bus 1413 via an interface, such as the display adapter 1407. It is contemplated that the computer 1401 may have more than one display adapter 1407 and the computer 1401 may have more than one display device 1411. The display device 1411 may be a monitor, an LCD (Liquid Crystal Display), light emitting diode (LED) display, television, smart lens, smart glass, and/or a projector. In addition to the display device 1411, other output peripheral devices may be components such as speakers (not shown) and a printer (not shown) which may be connected to the computer 1401 via the Input/Output Interface 1410. Any step and/or result of the methods may be output (or caused to be output) in any form to an output device. Such output may be any form of visual representation, including, but not limited to, textual, graphical, animation, audio, tactile, and the like. The display device 1411 and computer 1401 may be part of one device, or separate devices.

The computer 1401 may operate in a networked environment using logical connections to one or more remote computing devices 1414A,B,C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1501 and a remote computing device 1414A,B,C may be made via a network 1415, such as a local area network (LAN) and/or a general wide area network (WAN). Such network connections may be through the network adapter 1417. The network adapter 1417 may be implemented in both wired and wireless environments. Such networking environments are conventional and commonplace in dwellings, offices, enterprise-wide computer networks, intranets, and the Internet.

Application programs and other executable program components such as the operating system 1405 are shown herein as discrete blocks, although it is recognized that such programs and components reside at various times in different storage components of the computing device 1401, and are executed by the one or more processors 1403 of the computer. An implementation of the imaging software 1406 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   receiving, by a computing device, a three-dimensional image comprising a plurality of image segments and a plurality of surface gradient segments;
   generating, based on the three-dimensional image, a two-dimensional image comprising the plurality of image segments;
   determining, based on the two-dimensional image and the plurality of image segments, one or more candidate segments associated with an object boundary;
   determining, based on the three-dimensional image, at least one surface gradient segment for each of the one or more candidate segments that satisfies a gradient threshold; and
   determining, based on the at least one surface gradient segment for each of the one or more candidate segments, a boundary of a region of interest of the three-dimensional image.

2. The method of claim 1, wherein determining one or more candidate segments associated with the object boundary comprises at least one of: determining a hue associated with the one or more image segments or determining a saturation associated with the one or more image segments.

3. The method of claim 1, wherein determining the boundary region of interest of the three-dimensional image comprises selecting, based on a pixel vector associated with the at least one surface gradient segment and a distance to at least one of the plurality of image segments, at least one of a plurality of pixels.

4. The method of claim 1, wherein determining the boundary region of interest comprises determining at least one of: a change in a length of the boundary region, a change in a shape of the boundary region, or a change in an area of the boundary region.

5. The method of claim 1, further comprising determining, based on a number of pixels associated with the boundary region of interest and a number of pixels associated with a change in an area of the boundary region of interest, a boundary distance.

6. The method of claim 1, further comprising selecting, based on at least one of: the boundary region of interest, the object boundary, or the at least one surface gradient segment, a segmentation.

7. The method of claim 1, wherein the region of interest comprises a wound.

8. An apparatus comprising:
   one or more processors; and
   memory storing processor-executable instructions that, when executed by the one or more processors, cause the apparatus to:
   receive, by a computing device, a three-dimensional image comprising a plurality of image segments and a plurality of surface gradient segments;
   generate, based on the three-dimensional image, a two-dimensional image comprising the plurality of image segments;

determine, based on the two-dimensional image and the plurality of image segments, one or more candidate segments associated with an object boundary;

determine, based on the three-dimensional image, at least one surface gradient segment for each of the one or more candidate segments that satisfies a gradient threshold; and determine, based on the at least one surface gradient segment for each of the one or more candidate segments, a boundary of a region of interest of the three-dimensional image.

9. The apparatus of claim 8, wherein the processor executable instructions that, when executed by the one or more processors, determine one or more candidate segments associated with the object boundary, determine one or more candidate segments associated with the object boundary by determining at least one of: a hue associated with the one or more image segments or a saturation associated with the one or more image segments.

10. The apparatus of claim 8, wherein the processor executable instructions that, when executed by the one or more processors determine the boundary region of interest of the three-dimensional image, determine the boundary region of interest of the three-dimensional image by selecting, based on a pixel vector associated with the at least one surface gradient segment and a distance to at least one of the plurality of image segments, at least one of a plurality of pixels.

11. The apparatus of claim 8, wherein the processor executable instructions that, when executed by the one or more processors determine the boundary region of interest, determine the boundary region of interest by determining at least one of: a change in a length of the boundary region, a change in a shape of the boundary region, or a change in an area of the boundary region.

12. The apparatus of claim 8, wherein the processor executable instructions that, when executed by the one or more processors further cause the apparatus to determine, based on a number of pixels associated with the boundary region of interest and a number of pixels associated with a change in an area of the boundary region of interest, a boundary distance.

13. The apparatus of claim 8, wherein the processor executable instructions that, when executed by the one or more processors further cause the apparatus to select, based on at least one of: the boundary region of interest, the object boundary, or the at least one surface gradient segment, a segmentation.

14. The apparatus of claim 8, wherein the region of interest comprises a wound.

15. A system comprising:
an imaging device configured to:
generate a three-dimensional image comprising a plurality of image segments and a plurality of surface gradient segments; and
a computing device configured to:
receive a three-dimensional image comprising a plurality of image segments and a plurality of surface gradient segments;
generate, based on the three-dimensional image, a two-dimensional image comprising the plurality of image segments;
determine, based on the two-dimensional image and the plurality of image segments, one or more candidate segments associated with an object boundary;
determine, based on the three-dimensional image, at least one surface gradient segment for each of the one or more candidate segments that satisfies a gradient threshold; and
determine, based on the at least one surface gradient segment for each of the one or more candidate segments, a boundary of a region of interest of the three-dimensional image.

16. The system of claim 15, wherein to determine one or more candidate segments associated with the object boundary, the computing device is configured to determine at least one of: a hue associated with the one or more image segments or a saturation associated with the one or more image segments.

17. The system of claim 15, wherein to determine the boundary region of interest of the three-dimensional image, the computing device is configured to select, based on a pixel vector associated with the at least one surface gradient segment and a distance to at least one of the plurality of image segments, at least one of a plurality of pixels.

18. The system of claim 15, wherein to determine the boundary region of interest, the computing device is configured to determine at least one of: a change in a length of the boundary region, a change in a shape of the boundary region, or a change in an area of the boundary region.

19. The system of claim 15, wherein the computing device is further configured to determine, based on a number of pixels associated with the boundary region of interest and a number of pixels associated with a change in an area of the boundary region of interest, a boundary distance.

20. The system of claim 15, wherein the computing device is further configured to select, based on at least one of: the boundary region of interest, the object boundary, or the at least one surface gradient segment, a segmentation.

* * * * *